US012777404B2

(12) United States Patent
Preston et al.

(10) Patent No.: US 12,777,404 B2
(45) Date of Patent: Oct. 27, 2026

(54) MULTI-HOP REPEATER SYSTEMS

(71) Applicant: Pivotal Commware, Inc., Bothell, WA (US)

(72) Inventors: Shawn Edward Preston, Mercer Island, WA (US); Robert J. Sanchez, Encinitas, CA (US); Brandon Vernon Schaefer, Seattle, WA (US)

(73) Assignee: Pivotal Commware, Inc., Bothell, WA (US)

( * ) Notice: Subject to any disclaimer, the term of this patent is extended or adjusted under 35 U.S.C. 154(b) by 119 days.

(21) Appl. No.: 18/513,292

(22) Filed: Nov. 17, 2023

(65) Prior Publication Data

US 2024/0349164 A1 Oct. 17, 2024

Related U.S. Application Data

(60) Provisional application No. 63/426,667, filed on Nov. 18, 2022.

(51) Int. Cl.

| | |
|---|---|
| ***H04W 40/22*** | (2009.01) |
| ***H04W 16/28*** | (2009.01) |
| *H01Q 3/22* | (2006.01) |

(52) U.S. Cl.

CPC ........... *H04W 40/22* (2013.01); *H04W 16/28* (2013.01); *H01Q 3/22* (2013.01)

(58) Field of Classification Search

CPC ... H04W 40/22; H04W 16/28; H04W 84/047; H01Q 3/22; H04B 7/15528; H04B 7/088; H04B 7/06952

See application file for complete search history.

(56) References Cited

U.S. PATENT DOCUMENTS

| | | | |
|---|---|---|---|
| 2,131,108 | A | 9/1938 | Lindenblad |
| 4,464,663 | A | 8/1984 | Lalezari et al. |
| 6,133,880 | A | 10/2000 | Grangeat et al. |
| 6,150,987 | A | 11/2000 | Sole et al. |
| 6,529,745 | B1 | 3/2003 | Fukagawa et al. |
| 6,680,923 | B1 | 1/2004 | Leon |
| 7,084,815 | B2 | 8/2006 | Phillips et al. |
| 7,205,949 | B2 | 4/2007 | Turner |

(Continued)

FOREIGN PATENT DOCUMENTS

| | | | |
|---|---|---|---|
| AU | 2019239864 | B2 | 2/2023 |
| CA | 26833158 | C | 10/2016 |

(Continued)

OTHER PUBLICATIONS

Office Communication for U.S. Appl. No. 17/859,632 mailed Oct. 27, 2022, pp. 1-12.

(Continued)

*Primary Examiner* — Kenneth T Lam

(74) *Attorney, Agent, or Firm* — John W. Branch; Branch Partners PLLC

(57) ABSTRACT

Two or more repeaters can be aligned to provide for RF communication between a wireless base station and user equipment by way of the two or more repeaters. A first repeater can transmit a beacon signal with a plurality of transmit beam patterns, and a second repeater can detect the beacon signal with a plurality of receive beam patterns. The beacon signal can be generated by increasing RF gain in the first repeater to produce RF oscillations.

28 Claims, 5 Drawing Sheets

(56) References Cited

U.S. PATENT DOCUMENTS 8,521,080 B2 8/2013 Sakoda et al.
8,711,989 B1 4/2014 Lee et al.
8,755,566 B1 6/2014 McLaughlin et al.
9,356,356 B2 5/2016 Chang et al.
9,385,435 B2 7/2016 Bily et al.
9,450,310 B2 9/2016 Bily et al.
9,551,785 B1 1/2017 Geer
9,608,314 B1 3/2017 Kwon et al.
9,635,456 B2 4/2017 Fenichel
9,711,852 B2 7/2017 Chen et al.
9,806,414 B2 10/2017 Chen et al.
9,806,415 B2 10/2017 Chen et al.
9,806,416 B2 10/2017 Chen et al.
9,812,779 B2 11/2017 Chen et al.
9,813,141 B1 11/2017 Marupaduga et al.
9,936,365 B1 4/2018 Elam
9,955,301 B2 4/2018 Markhovsky et al.
10,014,948 B2 7/2018 Ashrafi
10,020,891 B2 7/2018 Ashrafi
10,033,109 B1 7/2018 Gummalla et al.
10,153,845 B2 12/2018 Ashrafi
10,187,156 B2 1/2019 Ashrafi
10,225,760 B1 3/2019 Black
10,277,338 B2 4/2019 Reial et al.
10,313,894 B1 6/2019 Desclos et al.
10,324,158 B2 6/2019 Wang et al.
10,326,203 B1 6/2019 Black et al.
10,333,217 B1 6/2019 Black et al.
10,374,710 B2 8/2019 Ashrafi
10,419,948 B1 * 9/2019 Labadie ................. H01Q 3/005
10,425,905 B1 * 9/2019 Black .................... H04W 52/42
10,431,899 B2 10/2019 Bily et al.
10,468,767 B1 11/2019 McCandless et al.
10,491,303 B2 11/2019 Ashrafi
10,505,620 B2 12/2019 Ito et al.
10,522,897 B1 12/2019 Katko et al.
10,524,154 B2 12/2019 Black
10,524,216 B1 12/2019 Black et al.
10,547,386 B2 1/2020 Ashrafi
10,594,033 B1 3/2020 Black et al.
10,673,646 B1 6/2020 Shinar et al.
10,734,736 B1 8/2020 McCandless et al.
10,862,545 B2 12/2020 Deutsch et al.
10,863,458 B2 12/2020 Black et al.
10,971,813 B2 4/2021 McCandless et al.
10,998,642 B1 5/2021 McCandless et al.
11,026,055 B1 6/2021 Rea
11,069,975 B1 7/2021 Mason et al.
11,088,433 B2 8/2021 Katko et al.
11,190,266 B1 11/2021 Black et al.
11,252,731 B1 2/2022 Levitsky et al.
11,279,480 B1 3/2022 Rezvani
11,297,606 B2 4/2022 Machado et al.
11,374,624 B2 6/2022 Deutsch et al.
11,424,815 B2 8/2022 Black et al.
11,431,382 B2 8/2022 Deutsch et al.
11,451,287 B1 9/2022 Sivaprakasam et al.
11,463,969 B2 10/2022 Li et al.
11,497,050 B2 11/2022 Black et al.
11,563,279 B2 1/2023 McCandless et al.
11,670,849 B2 6/2023 Mason et al.
11,706,722 B2 7/2023 Black et al.
11,757,180 B2 9/2023 McCandless et al.
11,843,955 B2 12/2023 Cavcic et al.
11,844,050 B2 12/2023 Machado et al.
11,848,478 B2 12/2023 Katko et al.
11,910,201 B2 2/2024 Ginis et al.
11,929,822 B2 3/2024 Black
11,937,199 B2 3/2024 Katko et al.
11,968,593 B2 4/2024 Rea
11,973,568 B2 4/2024 Black et al.
12,010,703 B2 6/2024 Black et al.
12,118,664 B2 10/2024 Ross et al.
12,177,697 B2 12/2024 Ginis et al.
12,185,453 B2 12/2024 McCandless et al.
12,362,472 B2 7/2025 McCandless et al.
12,425,987 B2 9/2025 Black et al.
12,495,377 B2 12/2025 Katko et al.
2001/0005406 A1 6/2001 Mege et al.
2002/0196185 A1 12/2002 Bloy
2003/0025638 A1 2/2003 Apostolos
2003/0062963 A1 4/2003 Aikawa et al.
2003/0151103 A1 8/2003 Endo et al.
2004/0003250 A1 1/2004 Kindberg et al.
2004/0038714 A1 2/2004 Rhodes et al.
2004/0229651 A1 11/2004 Hulkkonen et al.
2005/0237265 A1 10/2005 Durham et al.
2005/0282536 A1 12/2005 McClure et al.
2006/0025072 A1 2/2006 Pan
2007/0024514 A1 2/2007 Phillips et al.
2007/0147338 A1 6/2007 Chandra et al.
2007/0184828 A1 8/2007 Majidi-Ahy
2007/0202931 A1 8/2007 Lee et al.
2008/0039012 A1 2/2008 McKay et al.
2008/0049649 A1 2/2008 Kozisek et al.
2008/0181328 A1 7/2008 Harel et al.
2009/0086110 A1 4/2009 Beals et al.
2009/0153407 A1 6/2009 Zhang et al.
2009/0176487 A1 7/2009 DeMarco
2009/0207091 A1 8/2009 Anagnostou et al.
2009/0231215 A1 9/2009 Taura
2009/0296938 A1 12/2009 Devanand et al.
2010/0197222 A1 8/2010 Scheucher
2010/0207823 A1 8/2010 Sakata et al.
2010/0248659 A1 9/2010 Kawabata
2010/0302112 A1 12/2010 Lindenmeier et al.
2011/0070824 A1 3/2011 Braithwaite
2011/0199279 A1 8/2011 Shen et al.
2011/0292843 A1 12/2011 Gan et al.
2012/0064841 A1 3/2012 Husted et al.
2012/0094630 A1 4/2012 Wisnewski et al.
2012/0099856 A1 4/2012 Britz et al.
2012/0194399 A1 8/2012 Bily et al.
2013/0059620 A1 3/2013 Cho
2013/0069834 A1 3/2013 Duerksen
2013/0141190 A1 6/2013 Kitaoka et al.
2013/0171986 A1 7/2013 Shimizu
2013/0231066 A1 9/2013 Zander et al.
2013/0303145 A1 11/2013 Harrang et al.
2013/0324076 A1 12/2013 Harrang
2014/0073337 A1 3/2014 Hong et al.
2014/0094217 A1 4/2014 Stafford
2014/0171811 A1 6/2014 Lin et al.
2014/0198684 A1 7/2014 Gravely et al.
2014/0266946 A1 9/2014 Bily et al.
2014/0269417 A1 9/2014 Yu et al.
2014/0293904 A1 10/2014 Dai et al.
2014/0308962 A1 10/2014 Zhang et al.
2014/0349696 A1 11/2014 Hyde et al.
2015/0109178 A1 4/2015 Hyde et al.
2015/0109181 A1 4/2015 Hyde et al.
2015/0116153 A1 4/2015 Chen et al.
2015/0131618 A1 5/2015 Chen
2015/0162658 A1 6/2015 Bowers et al.
2015/0222021 A1 8/2015 Stevenson et al.
2015/0229028 A1 8/2015 Bily et al.
2015/0236777 A1 8/2015 Akhtar et al.
2015/0276926 A1 10/2015 Bowers et al.
2015/0276928 A1 10/2015 Bowers et al.
2015/0288063 A1 10/2015 Johnson et al.
2015/0318618 A1 11/2015 Chen et al.
2015/0372389 A1 12/2015 Chen et al.
2016/0037508 A1 2/2016 Sun
2016/0079672 A1 3/2016 Cerreno
2016/0087334 A1 3/2016 Sayama et al.
2016/0088648 A1 3/2016 Xue et al.
2016/0149308 A1 5/2016 Chen et al.
2016/0149309 A1 5/2016 Chen et al.
2016/0149310 A1 5/2016 Chen et al.
2016/0164175 A1 6/2016 Chen et al.
2016/0174241 A1 6/2016 Ansari et al.
2016/0198334 A1 7/2016 Bakshi et al.
2016/0219539 A1 7/2016 Kim et al.
2016/0241367 A1 8/2016 Irmer et al.

(56) References Cited

U.S. PATENT DOCUMENTS

| | | | | |
|---|---|---|---|---|
| 2016/0269964 | A1 | 9/2016 | Murray | |
| 2016/0302208 | A1 | 10/2016 | Sturkovich et al. | |
| 2016/0345221 | A1 | 11/2016 | Axmon et al. | |
| 2016/0365754 | A1 | 12/2016 | Zeine et al. | |
| 2016/0373181 | A1* | 12/2016 | Black | H04W 16/28 |
| 2017/0033858 | A1 | 2/2017 | Calcev et al. | |
| 2017/0041807 | A1 | 2/2017 | Lotter | |
| 2017/0085357 | A1 | 3/2017 | Shahar | |
| 2017/0118750 | A1 | 4/2017 | Kikuma et al. | |
| 2017/0127295 | A1 | 5/2017 | Black et al. | |
| 2017/0127296 | A1 | 5/2017 | Gustafsson et al. | |
| 2017/0127332 | A1 | 5/2017 | Axmon et al. | |
| 2017/0142652 | A1 | 5/2017 | Liu et al. | |
| 2017/0155192 | A1 | 6/2017 | Black et al. | |
| 2017/0155193 | A1 | 6/2017 | Black et al. | |
| 2017/0187123 | A1 | 6/2017 | Black et al. | |
| 2017/0187426 | A1 | 6/2017 | Su et al. | |
| 2017/0194704 | A1 | 7/2017 | Chawgo et al. | |
| 2017/0195054 | A1 | 7/2017 | Ashrafi | |
| 2017/0238141 | A1 | 8/2017 | Lindoff et al. | |
| 2017/0310017 | A1 | 10/2017 | Howard | |
| 2017/0339575 | A1 | 11/2017 | Kim et al. | |
| 2017/0367053 | A1 | 12/2017 | Noh et al. | |
| 2017/0373403 | A1 | 12/2017 | Watson | |
| 2018/0013193 | A1 | 1/2018 | Olsen et al. | |
| 2018/0019798 | A1 | 1/2018 | Khan et al. | |
| 2018/0026683 | A1 | 1/2018 | Manholm et al. | |
| 2018/0027555 | A1 | 1/2018 | Kim et al. | |
| 2018/0054251 | A1 | 2/2018 | Alex | |
| 2018/0066991 | A1 | 3/2018 | Mueller et al. | |
| 2018/0076521 | A1 | 3/2018 | Mehdipour et al. | |
| 2018/0097286 | A1 | 4/2018 | Black et al. | |
| 2018/0123692 | A1 | 5/2018 | Leiba | |
| 2018/0139627 | A1 | 5/2018 | Ashworth et al. | |
| 2018/0152810 | A1* | 5/2018 | Wang | H04W 24/10 |
| 2018/0177461 | A1 | 6/2018 | Bell et al. | |
| 2018/0219283 | A1 | 8/2018 | Wilkins et al. | |
| 2018/0227035 | A1 | 8/2018 | Cheng et al. | |
| 2018/0227445 | A1 | 8/2018 | Minegishi | |
| 2018/0233821 | A1 | 8/2018 | Pham et al. | |
| 2018/0270729 | A1 | 9/2018 | Ramachandra et al. | |
| 2018/0301821 | A1 | 10/2018 | Black et al. | |
| 2018/0322794 | A1 | 11/2018 | Beaurepaire et al. | |
| 2018/0337445 | A1 | 11/2018 | Sullivan et al. | |
| 2018/0368389 | A1 | 12/2018 | Adams | |
| 2019/0020107 | A1 | 1/2019 | Polehn et al. | |
| 2019/0052428 | A1 | 2/2019 | Chu et al. | |
| 2019/0053013 | A1 | 2/2019 | Markhovsky et al. | |
| 2019/0067813 | A1 | 2/2019 | Igura | |
| 2019/0103910 | A1 | 4/2019 | Alford et al. | |
| 2019/0115972 | A1 | 4/2019 | Braun et al. | |
| 2019/0116605 | A1 | 4/2019 | Luo et al. | |
| 2019/0124696 | A1* | 4/2019 | Islam | H04W 92/20 |
| 2019/0219982 | A1 | 7/2019 | Klassen et al. | |
| 2019/0221931 | A1 | 7/2019 | Black et al. | |
| 2019/0268780 | A1 | 8/2019 | Sarkar et al. | |
| 2019/0289482 | A1 | 9/2019 | Black | |
| 2019/0289560 | A1 | 9/2019 | Black et al. | |
| 2019/0293572 | A1 | 9/2019 | David et al. | |
| 2019/0336107 | A1 | 11/2019 | Hope Simpson et al. | |
| 2019/0372671 | A1 | 12/2019 | Ashrafi | |
| 2020/0008163 | A1 | 1/2020 | Black et al. | |
| 2020/0036413 | A1 | 1/2020 | Deutsch et al. | |
| 2020/0083605 | A1 | 3/2020 | Quarfoth et al. | |
| 2020/0083960 | A1 | 3/2020 | Ashrafi | |
| 2020/0091607 | A1 | 3/2020 | Black et al. | |
| 2020/0137698 | A1 | 4/2020 | Black et al. | |
| 2020/0186227 | A1 | 6/2020 | Reider et al. | |
| 2020/0205012 | A1 | 6/2020 | Bengtsson et al. | |
| 2020/0251802 | A1 | 8/2020 | Katko et al. | |
| 2020/0259552 | A1 | 8/2020 | Ashworth | |
| 2020/0266533 | A1 | 8/2020 | McCandless et al. | |
| 2020/0313741 | A1 | 10/2020 | Zhu et al. | |
| 2020/0358518 | A1 | 11/2020 | Tarighat Mehrabani | |
| 2020/0366363 | A1 | 11/2020 | Li et al. | |
| 2020/0396674 | A1* | 12/2020 | Yuan | H04W 48/18 |
| 2020/0403689 | A1 | 12/2020 | Rofougaran et al. | |
| 2021/0036437 | A1 | 2/2021 | Zhang et al. | |
| 2021/0037447 | A1 | 2/2021 | Tarighat Mehrabani | |
| 2021/0067237 | A1 | 3/2021 | Sampath et al. | |
| 2021/0088337 | A1 | 3/2021 | Koubaa | |
| 2021/0159945 | A1 | 5/2021 | Deutsch et al. | |
| 2021/0167819 | A1 | 6/2021 | Deutsch et al. | |
| 2021/0176719 | A1 | 6/2021 | Black et al. | |
| 2021/0176805 | A1 | 6/2021 | Labadie et al. | |
| 2021/0185623 | A1 | 6/2021 | Black et al. | |
| 2021/0234591 | A1 | 7/2021 | Eleftheriadis et al. | |
| 2021/0289366 | A1 | 9/2021 | Ginis et al. | |
| 2021/0313677 | A1 | 10/2021 | McCandless et al. | |
| 2021/0328366 | A1 | 10/2021 | McCandless et al. | |
| 2021/0328664 | A1 | 10/2021 | Schwab et al. | |
| 2021/0367684 | A1 | 11/2021 | Bendinelli et al. | |
| 2021/0368355 | A1 | 11/2021 | Liu et al. | |
| 2021/0376912 | A1 | 12/2021 | Black et al. | |
| 2022/0014933 | A1 | 1/2022 | Moon et al. | |
| 2022/0038858 | A1 | 2/2022 | Rea | |
| 2022/0046565 | A1 | 2/2022 | Prakash et al. | |
| 2022/0053433 | A1 | 2/2022 | Abedini et al. | |
| 2022/0069894 | A1* | 3/2022 | Lehnich | H04B 7/15507 |
| 2022/0070802 | A1 | 3/2022 | Jain et al. | |
| 2022/0078762 | A1 | 3/2022 | Machado et al. | |
| 2022/0085498 | A1 | 3/2022 | Mason et al. | |
| 2022/0085866 | A1 | 3/2022 | Lilja | |
| 2022/0085869 | A1 | 3/2022 | Black et al. | |
| 2022/0102828 | A1 | 3/2022 | Katko et al. | |
| 2022/0110001 | A1 | 4/2022 | Ginis et al. | |
| 2022/0130108 | A1 | 4/2022 | Ross et al. | |
| 2022/0191129 | A1 | 6/2022 | Ross et al. | |
| 2022/0232396 | A1 | 7/2022 | Cavcic et al. | |
| 2022/0240305 | A1* | 7/2022 | Black | H04B 7/155 |
| 2022/0302992 | A1 | 9/2022 | Sivaprakasam et al. | |
| 2022/0369295 | A1 | 11/2022 | Machado et al. | |
| 2023/0011531 | A1 | 1/2023 | Black | |
| 2023/0126395 | A1 | 4/2023 | McCandless et al. | |
| 2023/0155666 | A1 | 5/2023 | Black et al. | |
| 2023/0164796 | A1 | 5/2023 | Black et al. | |
| 2023/0171675 | A1* | 6/2023 | Lee | H04W 48/08 370/315 |
| 2023/0224987 | A1* | 7/2023 | Kim | H04W 92/18 370/315 |
| 2023/0337162 | A1 | 10/2023 | Katko et al. | |
| 2023/0354127 | A1* | 11/2023 | Fazili | H04B 7/15507 |
| 2024/0031953 | A1 | 1/2024 | Black et al. | |
| 2024/0039152 | A1 | 2/2024 | Mason et al. | |
| 2024/0154646 | A1* | 5/2024 | Wang | H01Q 19/104 |
| 2024/0222858 | A1 | 7/2024 | McCandless et al. | |
| 2024/0251256 | A1 | 7/2024 | Cavcic et al. | |
| 2024/0259831 | A1 | 8/2024 | Cavcic et al. | |
| 2024/0260006 | A1 | 8/2024 | Machado et al. | |
| 2024/0305349 | A1* | 9/2024 | Yu | H04B 7/06952 |
| 2024/0381371 | A1* | 11/2024 | Li | H04W 40/22 |
| 2024/0405862 | A1 | 12/2024 | Black | |
| 2024/0414671 | A1 | 12/2024 | Katko et al. | |
| 2024/0422508 | A1 | 12/2024 | Rea | |
| 2025/0151068 | A1 | 5/2025 | Black et al. | |

FOREIGN PATENT DOCUMENTS

| | | | |
|---|---|---|---|
| CA | 3092509 | A1 | 9/2019 |
| CN | 102948089 | A | 2/2013 |
| CN | 103700951 | A | 4/2014 |
| CN | 106572622 | A | 4/2017 |
| CN | 106664124 | A | 5/2017 |
| CN | 106797074 | A | 5/2017 |
| CN | 1085666462 | A | 9/2018 |
| CN | 109478900 | A | 3/2019 |
| CN | 110034416 | A | 7/2019 |
| CN | 110521277 | A | 11/2019 |
| CN | 111903063 | A | 11/2020 |
| EP | 3440778 | A1 | 10/2017 |
| EP | 3273629 | A1 | 1/2018 |
| EP | 3603329 | A1 | 9/2018 |
| EP | 3769429 | A1 | 9/2019 |
| EP | 3831115 | A1 | 2/2020 |

(56) References Cited

FOREIGN PATENT DOCUMENTS

| | | | |
|---|---|---|---|
| EP | 3928380 | A1 | 8/2020 |
| EP | 3806345 | A1 | 4/2021 |
| EP | 4085494 | A1 | 7/2021 |
| EP | 4136759 | A1 | 10/2021 |
| EP | 4158796 | A1 | 12/2021 |
| EP | 4278645 | A1 | 7/2022 |
| EP | 4285628 | A1 | 8/2022 |
| EP | 3928380 | B1 | 3/2024 |
| JP | S61-1102 | A | 1/1986 |
| JP | S63-142901 | U | 9/1988 |
| JP | H0936656 | A | 2/1997 |
| JP | H09214418 | A | 8/1997 |
| JP | 2000-111630 | A | 4/2000 |
| JP | 3307146 | B2 | 7/2002 |
| JP | 2003-110322 | A | 4/2003 |
| JP | 2004-032046 | A | 1/2004 |
| JP | 2004-270143 | A | 9/2004 |
| JP | 3600459 | B2 | 12/2004 |
| JP | 2007-081648 | A | 3/2007 |
| JP | 2007-306273 | A | 11/2007 |
| JP | 2008-153798 | A | 7/2008 |
| JP | 2009-514329 | A | 4/2009 |
| JP | 2009-1459304 | A | 7/2009 |
| JP | 2010-226457 | A | 10/2010 |
| JP | 2011-507367 | A | 3/2011 |
| JP | 2011-508994 | A | 3/2011 |
| JP | 2012-175189 | A | 9/2012 |
| JP | 2013-539949 | A | 10/2013 |
| JP | 2014-5040865 | A | 2/2014 |
| JP | 2014-075788 | A | 4/2014 |
| JP | 2014-120847 | A | 6/2014 |
| JP | 2014-5149076 | A | 6/2014 |
| JP | 2014-207626 | A | 10/2014 |
| JP | 2014-531826 | A | 11/2014 |
| JP | 2016-500214 | A | 1/2016 |
| JP | 2016-512408 | A | 4/2016 |
| JP | 2016-139965 | A | 8/2016 |
| JP | 2017-220825 | A | 12/2017 |
| JP | 2018-014713 | A | 1/2018 |
| JP | 2018-173921 | A | 11/2018 |
| JP | 2019-518355 | A | 6/2019 |
| JP | 2019-519956 | A | 7/2019 |
| JP | 2020-511890 | A | 4/2020 |
| JP | 2020-515162 | A | 5/2020 |
| JP | 2020-523863 | A | 8/2020 |
| JP | 2020-145614 | A | 9/2020 |
| JP | 2021-517406 | A | 7/2021 |
| JP | 69527007 | B2 | 10/2021 |
| JP | 2021-532683 | A | 11/2021 |
| JP | 2022-521286 | A | 4/2022 |
| JP | 2023-519067 | A | 5/2023 |
| JP | 2023-522640 | A | 5/2023 |
| JP | 2023-527384 | A | 6/2023 |
| JP | 7378414 | B2 | 11/2023 |
| JP | 2024-504621 | A | 2/2024 |
| JP | 2024-505881 | A | 2/2024 |
| JP | 7451491 | B2 | 3/2024 |
| JP | 7520861 | B2 | 7/2024 |
| JP | 7696908 | B2 | 6/2025 |
| KR | 10-2004-0006000 | A | 1/2004 |
| KR | 10-2005-0083901 | A | 8/2005 |
| KR | 10-2006-0031895 | A | 4/2006 |
| KR | 10-2006-0048953 | A | 5/2006 |
| KR | 10-2008-0093257 | A | 10/2008 |
| KR | 10-2012-0072144 | A | 7/2012 |
| KR | 10-2013-0080008 | A | 7/2013 |
| KR | 10-2016-0072062 | A | 6/2016 |
| KR | 10-2016-0113100 | A | 9/2016 |
| KR | 10-2019-0010545 | A | 1/2019 |
| KR | 10-2019-0133194 | A | 12/2019 |
| KR | 10-2020-0123254 | A | 10/2020 |
| KR | 10-2021-0048499 | A | 5/2021 |
| KR | 10-2021-0125579 | A | 10/2021 |
| KR | 10-2022-0129570 | A | 9/2022 |
| KR | 10-2023-0009895 | A | 1/2023 |
| KR | 10-2023-0017280 | A | 2/2023 |
| KR | 10-2023-0150811 | A | 10/2023 |
| KR | 10-2640129 | B1 | 2/2024 |
| KR | 10-2732844 | B1 | 11/2024 |
| KR | 10-28598091 | B1 | 9/2025 |
| KR | 10-2872581 | B1 | 10/2025 |
| TW | 202037208 | A | 10/2020 |
| WO | 03/0175293 | A1 | 2/2003 |
| WO | 2007/001134 | A1 | 1/2007 |
| WO | 2009/075282 | A1 | 6/2009 |
| WO | 2010/104435 | A1 | 9/2010 |
| WO | 2012/050614 | A1 | 4/2012 |
| WO | 2012/096611 | A2 | 7/2012 |
| WO | 2012/161612 | A1 | 11/2012 |
| WO | 2013/023171 | A1 | 2/2013 |
| WO | 2015/196044 | A1 | 12/2015 |
| WO | 2016/044069 | A1 | 3/2016 |
| WO | 2017/008851 | A1 | 1/2017 |
| WO | 2017/014842 | A1 | 1/2017 |
| WO | 2017/176746 | A1 | 10/2017 |
| WO | 2017/193056 | A1 | 11/2017 |
| WO | 2018/144940 | A1 | 8/2018 |
| WO | 2018/175615 | A1 | 9/2018 |
| WO | 2018/179870 | A1 | 10/2018 |
| WO | 2019/005307 | A1 | 1/2019 |
| WO | 2019/139745 | A1 | 7/2019 |
| WO | 2019/183072 | A1 | 9/2019 |
| WO | 2019/183107 | A1 | 9/2019 |
| WO | 2020/027990 | A1 | 2/2020 |
| WO | 2020/060705 | A1 | 3/2020 |
| WO | 2020/076350 | A1 | 4/2020 |
| WO | 2020/095597 | A1 | 5/2020 |
| WO | 2020/163052 | A1 | 8/2020 |
| WO | 2020/171947 | A1 | 8/2020 |
| WO | 2021/003112 | A1 | 1/2021 |
| WO | 2021/137898 | A1 | 7/2021 |
| WO | 2021/211354 | A1 | 10/2021 |
| WO | 2021/242996 | A1 | 12/2021 |
| WO | 2022/031477 | A1 | 2/2022 |
| WO | 2022/056024 | A1 | 3/2022 |
| WO | 2022/155529 | A1 | 7/2022 |
| WO | 2022/164930 | A1 | 8/2022 |
| WO | 2023/283352 | A1 | 1/2023 |
| WO | 2023/076405 | A1 | 5/2023 |
| WO | 2023/205182 | A1 | 10/2023 |
| WO | 2024/072997 | A1 | 4/2024 |
| WO | 2024/108180 | A1 | 5/2024 |

OTHER PUBLICATIONS

Office Communication for U.S. Appl. No. 17/891,970 mailed Jun. 16, 2023, pp. 1-11.

Office Communication for U.S. Appl. No. 17/891,970 mailed Sep. 25, 2023, pp. 1-8.

Office Communication for U.S. Appl. No. 17/980,391 mailed Jul. 3, 2023, pp. 1-9.

Office Communication for U.S. Appl. No. 18/136,238 mailed Jul. 20, 2023, pp. 1-8.

Search Report for Chinese Patent Application No. 201980019925.1 mailed on Sep. 19, 2021, pp. 1-2.

U.S. Appl. No. 14/510,947, filed Oct. 9, 2014, pp. 1-76.

U.S. Appl. No. 62/743,672, filed Oct. 10, 2018, pp. 1-278.

Office Communication for U.S. Appl. No. 17/334,105 mailed Oct. 25, 2023, pp. 4.

Office Communication for U.S. Appl. No. 18/136,238 mailed Oct. 25, 2023, pp. 1-9.

Office Communication for U.S. Appl. No. 17/334,105 mailed Nov. 8, 2023, pp. 1-13.

Office Communication for U.S. Appl. No. 17/334,105 mailed Nov. 16, 2023, pp. 2.

Office Action for Japanese Patent Application No. JP 2021-505304 mailed Oct. 26, 2023, 06 Pages including English translation.

Office Action for Japanese Patent Application No. JP 2021-549237 mailed Oct. 16, 2023, 06 Pages including English translation.

Office Communication for U.S. Appl. No. 17/891,970 mailed Feb. 12, 2024, pp. 1-8.

(56) References Cited

OTHER PUBLICATIONS

Decision to Grant for Japanese Patent Application No. JP 2021-505304 mailed Feb. 5, 2024, 06 Pages including English translation.
International Search Report and Written Opinion for International Patent Application No. PCT/US2023/080392 mailed Feb. 27, 2024, 15 Pages.
Office Communication for U.S. Appl. No. 17/974,278 mailed Mar. 28, 2024, pp. 1-8.
"Common understanding of repeaters", Qualcomm Incorporated, 3GPP TSG RAN WG4 #98_e, R4-2102829, 2021, Accessed: May 25, 2022, pp. 1-2.
"General views on NR repeater", MediaTek Inc., 3GPP TSG RAN WG4 #98_e, R4-2101156, 2021, Accessed: May 25, 2022, pp. 1-4.
Bjorn Ekman, "Machine Learning for Beam Based Mobility Optimization in NR," Master of Science Thesis in Communication Systems, Department of Electrical Engineering, Linkoping University, 2017, pp. 1-85.
Cheng et al., "Real-time two-dimensional beam steering with gate-tunable materials: a theoretical investigation", Applied Optics, vol. 55, No. 22, Aug. 1, 2016, pp. 6137-6144.
Eric J Black, "Holographic Beam Forming and MIMO," Pivotal Commware, 2017, pp. 1-8.
Falconer et al., "Coverage Enhancement Methods for LMDS," IEEE Communications Magazine, Jul. 2003, vol. 41, Iss. 7, pp. 86-92.
Gao et al., "Holographic Artificial Impedance Surface Antenna Based on Circular Patch", 2018 International Conference on Microwave and Millimeter Wave Technology (ICMMT), 2018, pp. 1-3.
Nishiyama et al., "Polarization Controllable Microstrip Antenna using Beam Lead PIN Diodes", 2006 Asia Pacific Microwave Conference, 2006, pp. 1-4.
Shimura et al., "A study of indoor area expansion by quasi-millimeter wave repeater," The Collection of Lecture Articles of the 2018 IEICE General Conference, Mar. 2018, pp. 1-5.
Vu et al., "Joint Load Balancing and Interference Mitigation in 5G Heterogeneous Networks," IEEE on Wireless Communications, 2017, vol. 16, No. 9, pp. 6032-6046.
Wolf et al., "Phased-Array Sources Based on Nonlinear Metamaterial Nanocavities", Nature Communications, vol. 6, 7667, 2015 Macmillan Publishers Limited, pp. 1-6.
Yurduseven et al., "Dual-Polarization Printed Holographic Multibeam Metasurface Antenna" Aug. 7, IEEE Antennas and Wireless Propagation Letters. PP. 10.1109/LAWP.2017, pp. 1-4.
Examination Report for European Patent Application No. 19772471.9 mailed Jul. 28, 2023, pp. 1-4.
Examination Report No. 1 for Australian Patent Application No. 2019239864, mailed Jul. 7, 2022, pp. 1-3.
Extended European Search Report for European Patent Application No. 19772471.9 mailed Nov. 8, 2021, 1-8 Pages.
Extended European Search Report for European Patent Application No. 19844867.2 mailed Mar. 30, 2022, pp. 1-16.
Extended European Search Report for European Patent Application No. 20759272.6 mailed Nov. 3, 2022, pp. 1-9.
Intention to Grant for European Patent Application No. 20759272.6 mailed Sep. 19, 2023, 11 pages.
International Preliminary Report on Patentability Chapter 1 for International Patent Application No. PCT/US2018/066329 mailed Jul. 23, 2020, pp. 1-7.
International Preliminary Report on Patentability Chapter I for International Patent Application No. PCT/US2019/022987 mailed Oct. 1, 2020, pp. 1-9.
International Preliminary Report on Patentability Chapter I for International Patent Application No. PCT/US2019/041053 mailed Feb. 11, 2021, pp. 1-6.
International Preliminary Report on Patentability Chapter I for International Patent Application No. PCT/US2019/047093 mailed Apr. 1, 2021, pp. 1-5.
International Preliminary Report on Patentability Chapter I for International Patent Application No. PCT/US2020/013713 mailed Aug. 19, 2021, pp. 1-6.
International Preliminary Report on Patentability Chapter I for International Patent Application No. PCT/US2020/016641 mailed Sep. 2, 2021, pp. 1-5.
International Preliminary Report on Patentability Chapter I for International Patent Application No. PCT/US2020/048806 mailed Jul. 14, 2022, pp. 1-7.
International Preliminary Report on Patentability Chapter I for International Patent Application No. PCT/US2021/034479 mailed Dec. 8, 2022, pp. 1-5.
International Preliminary Report on Patentability Chapter I for International Patent Application No. PCT/US2021/043308 mailed Feb. 16, 2023, pp. 1-6.
International Preliminary Report on Patentability Chapter I for International Patent Application No. PCT/US2021/049502 mailed Mar. 23, 2023, pp. 1-6.
International Preliminary Report on Patentability Chapter I for International Patent Application No. PCT/US2022/012613 mailed Jul. 27, 2023, pp. 1-5.
International Preliminary Report on Patentability Chapter I for International Patent Application No. PCT/US2022/013942 mailed Aug. 10, 2023, pp. 1-6.
International Preliminary Report on Patentability Chapter I for International Patent Application No. PCT/US2021/026400 mailed Oct. 27, 2022, pp. 1-5.
International Preliminary Report on Patentability for International Patent Application No. PCT/US2019/022942 mailed Oct. 1, 2020, pp. 1-8.
International Search Report and Written Opinion for International Patent Application No. PCT/US2018/066329 mailed May 31, 2019, pp. 1-8.
International Search Report and Written Opinion for International Patent Application No. PCT/US2019/022942 mailed Jul. 4, 2019, pp. 1-10.
International Search Report and Written Opinion for International Patent Application No. PCT/US2019/022987 mailed Jul. 2, 2019, pp. 1-11.
International Search Report and Written Opinion for International Patent Application No. PCT/US2019/041053 mailed Aug. 27, 2019, pp. 1-7.
International Search Report and Written Opinion for International Patent Application No. PCT/US2019/047093 mailed Oct. 21, 2019, pp. 1-6.
International Search Report and Written Opinion for International Patent Application No. PCT/US2020/013713 mailed Apr. 21, 2020, pp. 1-7.
International Search Report and Written Opinion for International Patent Application No. PCT/US2020/016641 mailed Apr. 14, 2020, pp. 1-6.
International Search Report and Written Opinion for International Patent Application No. PCT/US2020/048806 mailed Nov. 17, 2020, pp. 1-8.
International Search Report and Written Opinion for International Patent Application No. PCT/US2021/026400 mailed Jul. 20, 2021, pp. 1-6.
International Search Report and Written Opinion for International Patent Application No. PCT/US2021/034479 mailed Aug. 10, 2021, pp. 1-6.
International Search Report and Written Opinion for International Patent Application No. PCT/US2021/043308 mailed Nov. 2, 2021, pp. 1-7.
International Search Report and Written Opinion for International Patent Application No. PCT/US2021/049502 mailed Dec. 14, 2021, pp. 1-7.
International Search Report and Written Opinion for International Patent Application No. PCT/US2022/012613 mailed May 10, 2022, pp. 1-7.
International Search Report and Written Opinion for International Patent Application No. PCT/US2022/013942 mailed May 10, 2022, pp. 1-7.
International Search Report and Written Opinion for International Patent Application No. PCT/US2022/036381 mailed Oct. 25, 2022, pp. 1-8.

(56) References Cited

OTHER PUBLICATIONS

International Search Report and Written Opinion for International Patent Application No. PCT/US2022/047909 mailed Feb. 21, 2023, pp. 1-7.
International Search Report and Written Opinion for International Patent Application No. PCT/US2023/018993 mailed Jun. 27, 2023, pp. 1-9.
Notice of Acceptance for Australian Patent Application No. 2019239864 mailed Jan. 16, 2023, pp. 1-3.
International Preliminary Report on Patentability Chapter I for International Patent Application No. PCT/US2022/047909 mailed May 10, 2024, 5 Pages.
Office Communication for European Patent Application No. EP 19772471.9 mailed May 31, 2024, 9 pages.
Extended European Search report for European Patent Application No. EP 21814490.5 mailed May 28, 2024, 12 pages.
"3rd Generation Partnership Project; Technical Specification Group Services and System Aspects; 3GPP System Architecture Evolution (SAE); Security architecture (Release 15)", 3GPP TS 33.401, V15.11.0, Mar. 27, 2020 pp. 1-163.
Gemalto et al., "Background information for relay node security solution", 3GPP CT WG6 Meeting#59, C6-110135, Feb. 22-25, 2011, 13 pages.
Office Action for Chinese Patent Application No. 201980019925.1 mailed Sep. 27, 2021, 18 pages including English Translation.
Office Action for Japanese Patent Application No. JP 2020-548724 mailed Jun. 15, 2023, 06 Pages including English translation.
Office Action for Japanese Patent Application No. JP 2020-548724 mailed Mar. 8, 2023, 12 Pages including English translation.
Office Action for Japanese Patent Application No. JP 2021-505304 mailed May 9, 2023, 08 Pages including English translation.
Office Action for Korean Patent Application No. KR 10-2020-7029161 mailed Jul. 19, 2023, 16 Pages including English translation.
Office Communication for U.S. Appl. No. 15/870,758 mailed Apr. 16, 2019, pp. 1-10.
Office Communication for U.S. Appl. No. 15/870,758 mailed Oct. 1, 2018, pp. 1-12.
Office Communication for U.S. Appl. No. 15/925,612 mailed Dec. 19, 2018, pp. 1-12.
Office Communication for U.S. Appl. No. 15/925,612 mailed Jun. 15, 2018, pp. 1-9.
Office Communication for U.S. Appl. No. 16/049,630 mailed Apr. 12, 2019, pp. 1-13.
Office Communication for U.S. Appl. No. 16/049,630 mailed Aug. 19, 2020, pp. 1-18.
Office Communication for U.S. Appl. No. 16/049,630 mailed Aug. 7, 2019, pp. 1-13.
Office Communication for U.S. Appl. No. 16/049,630 mailed Dec. 9, 2019, pp. 1-13.
Office Communication for U.S. Appl. No. 16/049,630 mailed Feb. 18, 2020, pp. 1-5.
Office Communication for U.S. Appl. No. 16/049,630 mailed Jun. 24, 2019, pp. 1-5.
Office Communication for U.S. Appl. No. 16/049,630 mailed Mar. 31, 2020, pp. 1-15.
Office Communication for U.S. Appl. No. 16/049,630 mailed Oct. 15, 2020, pp. 1-14.
Office Communication for U.S. Appl. No. 16/049,630 mailed Oct. 4, 2018, pp. 1-13.
Office Communication for U.S. Appl. No. 16/136,119 mailed Mar. 15, 2019, pp. 1-8.
Office Communication for U.S. Appl. No. 16/136,119 mailed Nov. 23, 2018, pp. 1-12.
Office Communication for U.S. Appl. No. 16/268,469 mailed May 16, 2019, pp. 1-16.
Office Communication for U.S. Appl. No. 16/268,469 mailed Sep. 10, 2019, pp. 1-11.
Office Communication for U.S. Appl. No. 16/280,939 mailed Jul. 18, 2019, pp. 1-7.
Office Communication for U.S. Appl. No. 16/280,939 mailed May 13, 2019, pp. 1-22.
Office Communication for U.S. Appl. No. 16/292,022 mailed Jun. 7, 2019, pp. 1-13.
Office Communication for U.S. Appl. No. 16/292,022 mailed Sep. 23, 2019, pp. 1-9.
Office Communication for U.S. Appl. No. 16/358,112 mailed May 15, 2019, pp. 1-17.
Office Communication for U.S. Appl. No. 16/440,815 mailed Jan. 8, 2020, pp. 1-8.
Office Communication for U.S. Appl. No. 16/440,815 mailed Jul. 17, 2019, pp. 1-16.
Office Communication for U.S. Appl. No. 16/440,815 mailed Oct. 7, 2019, pp. 1-5.
Office Communication for U.S. Appl. No. 16/568,096 mailed Oct. 24, 2019, pp. 1-10.
Office Communication for U.S. Appl. No. 16/673,852 mailed Jun. 24, 2020, pp. 1-11.
Office Communication for U.S. Appl. No. 16/673,852 mailed Nov. 25, 2020, pp. 1-8.
Office Communication for U.S. Appl. No. 16/730,690 mailed Apr. 21, 2021, pp. 1-2.
Office Communication for U.S. Appl. No. 16/730,690 mailed Apr. 8, 2021, pp. 1-11.
Office Communication for U.S. Appl. No. 16/730,932 mailed Aug. 25, 2020, pp. 1-5.
Office Communication for U.S. Appl. No. 16/730,932 mailed Mar. 6, 2020, pp. 1-13.
Office Communication for U.S. Appl. No. 16/734,195 mailed Mar. 20, 2020, pp. 1-8.
Office Communication for U.S. Appl. No. 16/846,670 mailed Apr. 2, 2021, pp. 1-9.
Office Communication for U.S. Appl. No. 16/846,670 mailed Apr. 21, 2021, pp. 1-2.
Office Communication for U.S. Appl. No. 16/846,670 mailed Feb. 8, 2021, pp. 1-4.
Office Communication for U.S. Appl. No. 16/846,670 mailed Jun. 11, 2020, pp. 1-12.
Office Communication for U.S. Appl. No. 16/846,670 mailed Nov. 25, 2020, pp. 1-13.
Office Communication for U.S. Appl. No. 16/983,927 mailed Aug. 31, 2020, pp. 1-7.
Office Communication for U.S. Appl. No. 16/983,927 mailed Jan. 6, 2021, pp. 1-8.
Office Communication for U.S. Appl. No. 16/983,978 mailed Feb. 10, 2021, pp. 1-11.
Office Communication for U.S. Appl. No. 16/983,978 mailed Oct. 27, 2020, pp. 1-13.
Office Communication for U.S. Appl. No. 16/983,978 mailed Sep. 16, 2020, pp. 1-7.
Office Communication for U.S. Appl. No. 17/112,895 mailed Feb. 6, 2023, pp. 1-8.
Office Communication for U.S. Appl. No. 17/112,940 mailed Aug. 9, 2021, pp. 1-20.
Office Communication for U.S. Appl. No. 18/205,433 mailed Dec. 12, 2023, 17 Pages.
Office Communication for U.S. Appl. No. 17/980,391 mailed Nov. 21, 2023, 10 Pages.
Office Communication for U.S. Appl. No. 17/859,632 mailed Dec. 18, 2023, 10 Pages.
Office Communication for Korean Patent Application No. 10-2020-7029161 mailed Dec. 11, 2023, 6 Pages including English translation.
Office Communication for Japanese Patent Application No. JP 2020-548724 mailed Oct. 2, 2023, 05 Pages including English translation.
Office Communication for Korean Patent Application No. KR 10-2021-7006085 mailed Aug. 20, 2024, 11 pages including English Translation.
Pandi et al., "Antenna beam forming using holographic artificial impedance surface", IEEE, Jul. 17, 2014, 16th International Symposium on ANTEM, pp. 1-2.

(56) References Cited

OTHER PUBLICATIONS

Examination Report No. 1 for Australian Patent Application No. 2020226298, mailed Aug. 27, 2024, pp. 1-2.

Office Communication for Korean Patent Application No. KR 10-2021-7029953 mailed Sep. 2, 2024, 5 pages including English Translation.

Office Communication for Korean Patent Application No. KR 10-2022-7026864 mailed Aug. 26, 2024, 13 pages including English Translation.

Office Communication for Japan Patent Application No. JP 2022-562458 mailed Sep. 5, 2024, 8 pages including English Translation.

Office Communication for U.S. Appl. No. 18/244,541 mailed Aug. 14, 2024, pp. 1-15.

Office Communication for U.S. Appl. No. 17/974,278 mailed Sep. 24, 2024, pp. 1-8.

Office Communication for U.S. Appl. No. 18/599,692 mailed Sep. 24, 2024, pp. 1-11.

Office Communication for Japan Patent Application No. JP 2022-540857 mailed Sep. 19, 2024, 14 pages including English Translation.

Office Communication for Japan Patent Application No. JP 2022-562458 mailed Sep. 5, 2024, 6 pages including English Translation.

Office Communication for Japan Patent Application No. JP 2021-549237 mailed Jun. 11, 2024, 5 pages including English Translation.

"Automatic Cell Planning (ACP)", Forsk, Retrieved on Jul. 18, 2024, Webpage available at: <https://www.forsk.com/automatic-cell-planning-acp> 7 pages.

"Nvidia Unveils 6G Research Cloud Platform to Advance Wireless Communications With AI", Nvidia, Retrieved on Mar. 18, 2024, Available at <https://nvidianews.nvidia.com/news/nvidia-unveils-6g-research-cloud-platform-to-advance-wireless-communications-with-ai>, 2 pages.

Julien Berranger, "Siradel releases Bloonet its innovative solution for RAN design automation", Siradel, Retrieved on Oct. 21, 2021, Webpage available at: https://www.siradel.com/siradel-releases-bloonet-its-innovative-solution-for-ran-design-automation/, 6 pages.

"Mapbox Unveils Digital Twin in Partnership with Snowflake and Maxar to Revolutionize Telecom Visualization", Mapbox, Retrieved on Feb. 26, 2024, Webpage available at: https://www.mapbox.com/press-releases/mapbox-unveils-digital-twin-in-partnership-with-snowflake-and-maxar-to-revolutionize-telecom-visualization, 7 pages.

Monica Wamsley, "Blare Tech Builds 5G Network Planning Tools with CesiumJS", Cesium, Retrieved on Jan. 30, 2024, Webpage available at: https://cesium.com/blog/2024/01/30/blare-tech-builds-5g-network-planning-tools-with-cesiumjs/, 6 pages.

"Bridging the Gap Between Indoor and Outdoor Wireless", iBwave Reach, iBwave Solutions Inc., 1994-2020, 5 pages.

Terragraph Mesh, Retrieved on Jul. 18, 2024, Webpage Available at: <https://terragraph.com/assets/files/Terragraph_Mesh_Whitepaper-d906f1eb9c3ea7a8c1bbd8552b1f9f2d.pdf>, 11 pages.

"Canny edge detector", Scikit-image, Retrieved on Jul. 18, 2024, Webpage available at: <https://scikit-image.org/docs/stable/auto_examples/edges/plot_canny.html#sphx-glr-auto-examples-edges-plot-canny-py>, 2 pages.

"5G Fixed Wireless Access: Can FWA meet our cities needs?", Digital Twin SIM, Retrieved on Jul. 18, 2024, Webpage Available at: https://www.digitaltwinsim.com/fwa_modeling, 07 pages.

ETSI, "5G; Study on channel model for frequencies from 0.5 to 100 GHz (3GPP TR 38.901 version 17.1.0 Release 17)", ETSI TR 138 901, version 17.1.0, Release 17, Jan. 2024, 99 pages.

Office Communication for U.S. Appl. No. 18/530,034 mailed Jul. 15, 2024, pp. 1-7.

Extended European Search report for European Patent Application No. EP 22740187.4 mailed Nov. 14, 2024, 8 pages.

Zhou et al., "Robotic Millimeter-Wave Wireless Networks", IEEE/ACM Transactions on Networking, vol. 28, No. 4, Aug. 1, 2020, pp. 1534-1549.

Zeng et al., "Accessing From the Sky: A Tutorial on UAV Communications for 5G and Beyond", arxiv.org, Cornell University Library, IEEE, Mar. 13, 2019, pp. 1-46.

Extended European Search report for European Patent Application No. EP 22746545.7 mailed Nov. 20, 2024, 8 pages.

Office Communication for Korean Patent Application No. KR 10-2022-7039537 mailed Apr. 1, 2025, 14 pages including English Translation.

Office Communication for U.S. Appl. No. 18/141,201 mailed Oct. 24, 2024, pp. 1-6.

Office Communication for U.S. Appl. No. 18/205,433 mailed Sep. 30, 2024, 14 Pages.

Office Communication for U.S. Appl. No. 17/974,278 mailed Nov. 21, 2024, 4 Pages.

Office Communication for U.S. Appl. No. 18/244,541 mailed Mar. 12, 2025, 6 Pages.

Office Communication for U.S. Appl. No. 18/529,995 mailed Oct. 16, 2024, 13 Pages.

Office Communication for U.S. Appl. No. 18/607,965 mailed Feb. 25, 2025, 14 Pages.

Office Communication for U.S. Appl. No. 18/642,120 mailed Mar. 11, 2025, 7 Pages.

Office Action for Canadian Patent Application No. 3,092,509 mailed Mar. 12, 2025, 4 Pages.

International Preliminary Report on Patentability Chapter I for International Patent Application No. PCT/US2023/018993 mailed Oct. 31, 2024, 7 Pages.

International Preliminary Report on Patentability Chapter I for International Patent Application No. PCT/US2023/034033 mailed Apr. 10, 2025, 5 Pages.

Office Communication for Japan Patent Application No. JP 2022-540857 mailed May 13, 2025, 5 pages including English Translation.

Office Communication for Japan Patent Application No. JP 2022-562458 mailed Mar. 27, 2025, 2 pages including English Translation.

Office Communication for Korean Patent Application No. KR 10-2021-7006085 mailed Feb. 26, 2025, 2 pages including English Translation.

Office Communication for Australian Patent Application No. AU 2020226298 mailed Oct. 8, 2024, 3 pages.

Extended European Search report for European Patent Application No. EP 22838415.2 mailed Mar. 27, 2025, 14 pages.

Office Communication for U.S. Appl. No. 17/980,391 mailed Apr. 12, 2024, 5 Pages.

Extended European Search report for European Patent Application No. EP 21788290.1 mailed Mar. 28, 2024, 9 pages.

Office Communication for European Patent Application No. 19844867.2 mailed Apr. 16, 2024, 8 Pages.

Extended European Search report for European Patent Application No. EP 20908525.7 mailed Jan. 3, 2024, 11 pages.

Nawaz et al., "Double-Differential-Fed, Dual-Polarized Patch Antenna With 90 dB Interport RF Isolation for a 2.4 GHz In-Band FullDuplex Transceiver", IEEE Antennas and Wireless Propagation Letters, vol. 17, No. 2, Feb. 2018, pp. 287-290.

International Search Report and Written Opinion for International Patent Application No. PCT/US2023/034033 mailed Dec. 12, 2023, 13 Pages.

International Preliminary Report on Patentability Chapter I for International Patent Application No. PCT/US2022/036381 mailed Jan. 18, 2024, 6 Pages.

Office Communication for Korean Patent Application No. 10-2021-7029953 mailed Jan. 2, 2024, 8 Pages including English translation.

Office Communication for U.S. Appl. No. 17/112,940 mailed Dec. 22, 2021, pp. 1-15.

Office Communication for U.S. Appl. No. 17/112,940 mailed Jul. 21, 2021, pp. 1-22.

Office Communication for U.S. Appl. No. 17/112,940 mailed Mar. 17, 2022, pp. 1-14.

Office Communication for U.S. Appl. No. 17/177,131 mailed Apr. 27, 2022, pp. 1-14.

Office Communication for U.S. Appl. No. 17/177,131 mailed Apr. 9, 2021, pp. 1-17.

Office Communication for U.S. Appl. No. 17/177,131 mailed Aug. 6, 2021, pp. 1-16.

(56) References Cited

OTHER PUBLICATIONS

Office Communication for U.S. Appl. No. 17/177,131 mailed Dec. 17, 2021, pp. 1-14.
Office Communication for U.S. Appl. No. 17/177,131 mailed Nov. 12, 2021, pp. 1-5.
Office Communication for U.S. Appl. No. 17/177,145 mailed Apr. 19, 2021, pp. 1-11.
Office Communication for U.S. Appl. No. 17/177,145 mailed Aug. 3, 2021, pp. 1-16.
Office Communication for U.S. Appl. No. 17/177,145 mailed Jun. 3, 2022, pp. 1-5.
Office Communication for U.S. Appl. No. 17/177,145 mailed Mar. 24, 2022, pp. 1-18.
Office Communication for U.S. Appl. No. 17/177,145 mailed Nov. 16, 2021, pp. 1-16.
Office Communication for U.S. Appl. No. 17/177,145 mailed Oct. 14, 2021, pp. 1-5.
Office Communication for U.S. Appl. No. 17/203,255 mailed Apr. 26, 2022, pp. 1-17.
Office Communication for U.S. Appl. No. 17/203,255 mailed May 5, 2022, pp. 1-2.
Office Communication for U.S. Appl. No. 17/217,882 mailed May 15, 2023, pp. 1-6.
Office Communication for U.S. Appl. No. 17/217,882 mailed Oct. 13, 2022, pp. 1-14.
Office Communication for U.S. Appl. No. 17/306,361 mailed Mar. 28, 2022, pp. 1-7.
Office Communication for U.S. Appl. No. 17/306,361 mailed Sep. 27, 2022, pp. 1-7.
Office Communication for U.S. Appl. No. 17/306,361 mailed Sep. 9, 2022, pp. 1-7.
Office Communication for U.S. Appl. No. 17/332,136 mailed Sep. 2, 2021, pp. 1-9.
Office Communication for U.S. Appl. No. 17/334,105 mailed Aug. 11, 2023, pp. 1-16.
Office Communication for U.S. Appl. No. 17/334,105 mailed Nov. 30, 2022, pp. 1-7.
Office Communication for U.S. Appl. No. 17/379,813 mailed Feb. 15, 2023, pp. 1-3.
Office Communication for U.S. Appl. No. 17/379,813 mailed Feb. 3, 2023, pp. 1-10.
Office Communication for U.S. Appl. No. 17/379,813 mailed Oct. 5, 2022, pp. 1-11.
Office Communication for U.S. Appl. No. 17/397,442 mailed Jun. 23, 2023, pp. 1-15.
Office Communication for U.S. Appl. No. 17/397,442 mailed Oct. 27, 2022, pp. 1-8.
Office Communication for U.S. Appl. No. 17/397,442 mailed Sep. 8, 2023, pp. 1-16.
Office Communication for U.S. Appl. No. 17/469,694 mailed Jan. 20, 2022, pp. 1-9.
Office Communication for U.S. Appl. No. 17/537,233 mailed Apr. 20, 2022, pp. 1-9.
Office Communication for U.S. Appl. No. 17/537,233 mailed Feb. 4, 2022, pp. 1-9.
Office Communication for U.S. Appl. No. 17/576,832 mailed Apr. 1, 2022, pp. 1-14.
Office Communication for U.S. Appl. No. 17/576,832 mailed Apr. 28, 2023, pp. 1-15.
Office Communication for U.S. Appl. No. 17/576,832 mailed Aug. 16, 2023, pp. 1-7.
Office Communication for U.S. Appl. No. 17/576,832 mailed Aug. 24, 2023, pp. 1-4.
Office Communication for U.S. Appl. No. 17/576,832 mailed Dec. 15, 2022, pp. 1-15.
Office Communication for U.S. Appl. No. 17/576,832 mailed Jul. 13, 2022, pp. 1-15.
Office Communication for U.S. Appl. No. 17/576,832 mailed Jul. 13, 2023, pp. 1-3.
Office Communication for U.S. Appl. No. 17/576,832 mailed Mar. 18, 2022, pp. 1-15.
Office Communication for U.S. Appl. No. 17/576,832 mailed Sep. 23, 2022, pp. 1-5.
Office Communication for U.S. Appl. No. 17/585,418 mailed Apr. 8, 2022, pp. 1-9.
Office Communication for U.S. Appl. No. 17/585,418 mailed Aug. 4, 2022, pp. 1-2.
Office Communication for U.S. Appl. No. 17/585,418 mailed Jul. 22, 2022, pp. 1-6.
Office Communication for U.S. Appl. No. 17/708,757 mailed Aug. 4, 2023, pp. 1-8.
Office Communication for U.S. Appl. No. 17/708,757 mailed Jan. 20, 2023, pp. 1-5.
Office Communication for U.S. Appl. No. 17/859,632 mailed Aug. 8, 2023, pp. 1-14.
Office Communication for U.S. Appl. No. 17/859,632 mailed Feb. 28, 2023, pp. 1-13.
Office Communication for U.S. Appl. No. 17/859,632 mailed May 16, 2023, pp. 1-4.
Office Communication for U.S. Appl. No. 18/529,995 mailed Jan. 15, 2026, 10 Pages.
First Examination Report for Indian Patent Application No. IN 202217074598 mailed Feb. 6, 2026, 13 pages.
Partial Supplementary European Search report for European Patent Application No. EP 23792450.1 mailed Feb. 11, 2026, 14 pages.
Nokia et al., "Discussion on UL time and frequency synchronization for NTN", 3GPP TSG RAN WG #102, R1-2006422, Aug. 17-29, 2020, 11 pages.
Office Communication for Japan Patent Application No. JP 2023-542685 mailed Mar. 18, 2026, 11 pages including English Translation.
Office Communication for European Patent Application No. EP 22746545.7 mailed Mar. 16, 2026, 7 pages.
Office Communication for U.S. Appl. No. 18/374,539 mailed Mar. 20, 2026, 15 Pages.
Office Communication for Japan Patent Application No. JP 2022-572655 mailed May 29, 2025, 4 pages including English Translation.
Office Communication for U.S. Appl. No. 18/141,201 mailed Jul. 8, 2025, 12 Pages.
Office Communication for U.S. Appl. No. 18/529,995 mailed Jun. 18, 2025, 10 Pages.
International Preliminary Report on Patentability Chapter I for International Patent Application No. PCT/US2023/080392 mailed May 30, 2025, 7 Pages.
Office Communication for Korean Patent Application No. KR 10-2022-7026864 mailed Jun. 10, 2025, 4 pages including English Translation.
Office Communication for European Patent Application No. EP 20908525.7 mailed Oct. 17, 2025, 8 pages.
Office Communication for Korean Patent Application No. KR 10-2022-7045890 mailed Sep. 5, 2025, 6 pages including English Translation.
Office Communication for U.S. Appl. No. 18/374,539 mailed Sep. 11, 2025, 17 Pages.
Office Communication for U.S. Appl. No. 18/529,995 mailed Aug. 6, 2025, 3 Pages.
Office Communication for U.S. Appl. No. 18/607,965 mailed Sep. 5, 2025, 9 Pages.
Office Communication for U.S. Appl. No. 18/607,965 mailed Oct. 31, 2025, 8 Pages.

* cited by examiner

MULTI-HOP REPEATER SYSTEMS

CROSS-REFERENCE TO RELATED APPLICATION

This application is a Utility Patent application based on previously filed U.S. Provisional Patent Application No. 63/426,667 filed on Nov. 18, 2022. The benefit of the filing date of this provisional application is hereby claimed under 35 U.S.C. § 119 (e) and the contents of this provisional application are herein incorporated by reference in their entirety.

TECHNICAL FIELD

The invention generally relates to aligning two or more repeaters to provide for RF communication between a wireless base station and user equipment by way of the two or more repeaters.

BACKGROUND

RF repeaters can expand the service area that is covered by a given wireless base station such as a 5G gNodeB base station. For example, RF repeaters can rebroadcast signals from the wireless base station into areas that are not directly accessible by the base station, such as indoor areas or areas having an obstructed line of sight to the wireless base station. In a "multi-hop" repeater scenario, a first RF repeater can rebroadcast signals from a base station, and a second RF repeater can rebroadcast signals from the first RF repeater. Optionally, a third RF repeater can rebroadcast signals from the first RF repeater and/or the second RF repeater, and so on. These multi-hop repeater scenarios require alignment between the repeaters to efficiently relay communications data between the base station and end user equipment such as a mobile device or a fixed wireless access (FWA) device.

DESCRIPTION OF VARIOUS EMBODIMENTS OF THE INVENTION

Figure 1:
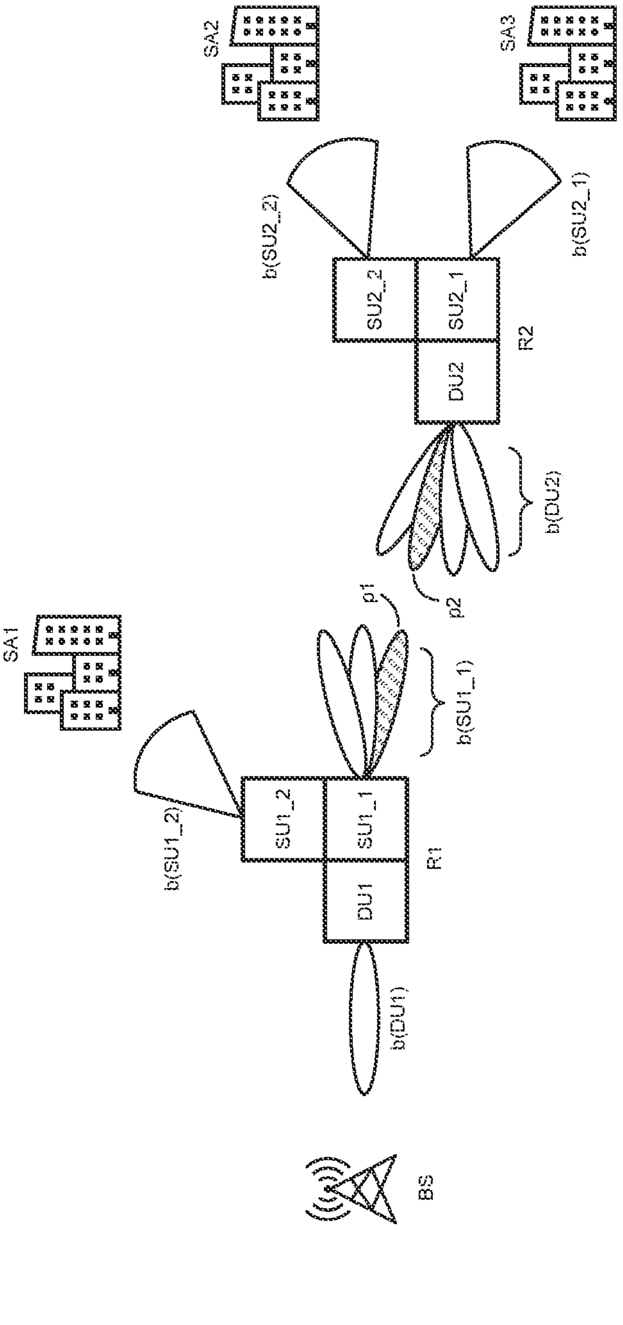
FIG. 1 depicts an illustrative multi-hop repeater system that includes two repeaters.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, devices, or computer-readable media. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments of the invention are directed to a methods, systems, and computer readable media for commissioning and alignment of repeaters within multi-hop wireless communications network. The multi-hop wireless communications network can include, for example, two or more repeaters that extend the service area of a given wireless base station in a multi-hop fashion that includes a first "hop" by a first repeater rebroadcasting signals from a base station and a second "hop" by a second repeater rebroadcasting signals from the first repeater. Additional "hops" may be provided by additional repeaters rebroadcasting signals from the first, second, or subsequent repeaters in various series or parallel repeater configurations.

A wireless communication network may include wireless base stations, outdoor network repeaters, and indoor subscriber repeaters and/or customer premises equipment (CPEs) for fixed wireless access (FWA). Wireless base stations may include, for example, gNodeB (gNB) base stations for 5G communications at FR1 or FR2 frequency bands. FR1 includes frequency bands below about 7 GHz. FR2 includes frequency bands above about 24 GHz, also referred to as millimeter wave (mmW) frequencies. Wireless base stations can also include base stations for 6G or higher generation wireless communications, or other wireless protocols. Throughout this disclosure, the use of the term gNB may refer to base stations generally without being limited to 5G base stations.

Outdoor network repeaters include devices that can be installed on a post, pole, strand, building corner, or other structure and configured to receive signals from a wireless base station (or from another repeater) and rebroadcast the received signals. For two-way communication, the open-air repeater can also receive signals and rebroadcast them to the wireless base station. In some approaches, the open-air repeater includes a donor antenna that can be adjusted to point a beam at the relevant wireless base station (or other repeater), and one or more service antennas providing one or more beams that covers one or more respective rebroadcast service areas. The donor antenna and/or the one or more service antennas can include static antennas such as patch or horn antennas and/or electrically adjustable antennas such as phased array antennas or holographic beamforming antennas. Various open-air repeater structures are described, for example, in U.S. Pat. No. 10,425,905, which is herein incorporated by reference.

Indoor subscriber repeaters include devices that can be installed on a window, wall, roof, or other structural feature of a building and configured to receive signals from a wireless base station (or from another repeater) and rebroadcast the received signals to premises within the building (e.g., behind the window or wall). For two-way communication, the window repeater can also receive signals from within the premises and rebroadcast them to a wireless base station (or another repeater) outside the premises. The indoor subscriber repeater can be entirely mounted on the outside of the structural feature, or entirely mounted on the inside of the structural feature, or it can have exterior and interior portions, e.g., that adjoin exterior and interior surfaces of a wall or window. In some approaches, the indoor subscriber repeater includes a donor antenna that can be adjusted to point a beam at the relevant wireless base station (or other repeater) outside of the premises, and one or more service antennas providing one or more beams that covers the interior of the premises. The donor antenna and/or the one or more service antennas can include static antennas such as patch or horn antennas and/or electrically adjustable antennas such as phased array antennas or holographic beamforming antennas. Various indoor subscriber repeater structures are described, for example, in U.S. Pat. No. 10,425,905, which is herein incorporated by reference.

Customer premises equipment (CPEs) include devices that can provide fixed wireless access (FWA) for interior premises such as the interior of a dwelling unit in a multiple dwelling unit (MDU), or the interior of a dwelling unit in a single dwelling unit or single family unit (SFU). Customer premises equipment can include a receive antenna that receives signals from a base station or repeater within a vicinity of the building; for two-way communication, the customer premises equipment can also include a transmit antenna that transmits signals to the base station or repeater; or a single antenna can serve for both transmit and receive functions. The receive and/or transmit antenna(s) can include static antennas such as patch or horn antennas and/or electrically adjustable antennas such as phased array antennas or holographic beamforming antennas. The customer premises equipment can provide internet access within the interior premises, for example, by including WiFi and/or ethernet modules. In some approaches, the CPE can be a single unit, e.g., that is mounted on a window of an MDU. In other approaches, the CPE can include an exterior antenna module, e.g., for wireless communication with the base station or repeater, and an interior module, e.g., for providing WiFi or ethernet access within the premises.

Within a multi-hop wireless communications network, any of the various network elements (e.g., wireless base stations, open-air repeaters, indoor subscriber repeater, and/or customer premises equipment) may be monitored, controlled, and or commissioned for operation by a control system, which can include, for example, a distributed cloud computing system that communicates with one or more of the network elements via an internet-of-things (IoT) messaging protocol. Various control systems for repeaters are described, for example, in U.S. Pat. No. 11,190,266, which is herein incorporated by reference. The commissioning of the repeaters with the control system can include orchestrating alignment of the repeaters for multi-hop operation, as further described in the illustrative examples set forth below.

Example 1: Two-Repeater System

With reference now to FIG. 1, an illustrative two-repeater system is depicted. In this example, it is desirable to use a first repeater R1 and a second repeater R2 to expand the area that is served by the wireless base station BS.

Repeater R1 includes a donor unit DU1 that communicates with the base station BS, and one or more service units SU1 that communicate with user equipment and/or with one or more other repeaters. The donor unit DU1 can include, for example, a donor antenna casting a beam b(DU1) for communication with the base station BS.

Repeater R1 includes a first service unit SU1_1 that communicates with the second repeater R2. The service unit SU1_1 that communicates with repeater R2 can include an electrically steerable antenna such as a phased-array antenna, a holographic beamforming (HBF) antenna, or a digital beamforming antenna, so that the service unit SU1_1 can be configured to transmit with a variety of transmit beams, here illustrated as a set of narrow beams b(SU1_1). The variety of transmit beams allows for alignment of repeater R1 with repeater R2, as discussed below.

Repeater R1 can optionally include additional service units. For example, repeater R1 can include an additional service unit SU1_2 that communicates with user equipment via a beam b(SU1_2) that illuminates a service area SA1. In this illustrative example, the service area SA1 is depicted as a building such as a multiple dwelling unit (MDU), but in various embodiments, the service area can encompass any region in which user equipment, fixed or mobile, may be situated. While the beam b(SU1_2) illuminating the service area SA1 is here depicted as a single broad beam, in various embodiments the service unit SU1_2 can broadcast a static broad or narrow beam (e.g., with a wide- or narrow-beam horn antenna) or a set of adjustable broad or narrow beams (e.g., with an electrically steerable antenna such as a phased-array antenna, a holographic beamforming (HBF) antenna, or a digital beamforming antenna).

In the illustrative example, repeater R2 includes a donor unit DU2 that communicates with repeater R1. The donor unit DU2 can include an electrically steerable antenna such as a phased-array antenna, a holographic beamforming (HBF) antenna, or a digital beamforming antenna, so that the donor unit can be configured to receive with a variety of receive beams, here illustrated as a set of narrow beams b(DU2). The variety of receive beams allows for alignment of repeater R1 with repeater R2, as discussed below. Repeater R2 also includes one or more service units SU2_1, SU2_2 that communicate with user equipment via one or more beams b(SU2_1), b(SU2_2) that illuminate respective service areas SA2, SA3 for the repeater R2. Thus, base station BS can communicate with user equipment in service area SA1 by way of repeater R1, and base station BS can communicate with user equipment in service areas SA2 and SA3 by way of repeater R2 when repeater R2 is aligned with repeater R1 for multi-hop operation.

Generally speaking, repeater R1 and repeater R2 may be monitored, controlled, and/or commissioned for operation by a control system, which can be, for example, a distributed cloud computing system that communicates with repeater R1 and repeater R2 via an internet-of-things (IoT) messaging protocol. A control system for repeaters is described, for example, in U.S. Pat. No. 11,190,266, which is herein incorporated by reference.

An alignment of repeater R1 with repeater R2 may proceed as follows. First, the control system can instruct repeater R1 to generate a beacon signal. For example, the control system can instruct repeater R1 to increase an RF gain in the repeater to produce RF oscillations that serve as the beacon signal. Generally speaking, RF oscillations are undesirable electromagnetic oscillations that can occur due to feedback in an amplifying device such as an RF repeater, and during normal operation of the repeater, these RF oscillations may be suppressed. However, during commissioning of the repeater system in a multi-hop configuration, the RF oscillations can be deliberately introduced to provide a beacon signal for alignment purposes.

Second, the control system can instruct repeater R1 to repeatedly adjust the transmit antenna on repeater R1 to broadcast the beacon signal with a plurality of transmit beam patterns (e.g., the beamset b(SU1_1) in FIG. 1). The plurality of transmit beam patterns can be a sequence (e.g., a dither sequence) of transmit beams that substantially fill a selected range of elevation and/or azimuth, with the objective of finding a preferred transmit beam matching the elevation and/or azimuth of the target, i.e., repeater R2. In some approaches, the selected range of elevation and/or azimuth is the entire beamwidth of the transmit antenna. In other approaches, the selected range is a reduced range of elevation and/or azimuth. For example, repeater R1 may be physically installed with a mechanical orientation that is selected to approximately point the transmit antenna at repeater R2. Because there might be a range of uncertainty for mechanical orientation of repeater R1 for alignment with repeater R2, a selected range of elevation and/or azimuth can correspond to the range of uncertainty for mechanical orientation. As another example, the range of elevation and/or azimuth can correspond to a range of discrepancy between a reported mechanical orientation from installation of the first repeater and an expected bearing from the first repeater to the second repeater based on global navigation satellite system (GNSS) coordinates (e.g., GPS coordinates) of repeaters R1 and R2. While embodiments of the invention include a plurality of beams in the beamset b(SU1_1), it is contemplated that in other embodiments of the invention, the service unit SU1_1 may only broadcast the beacon signal with a single transmit beam, e.g., in a scenario where SU1_1 transmits the beacon signal with a static antenna such as a horn antenna.

Third, the control system can instruct repeater R2 to repeatedly adjust the receive antenna on repeater R2 to receive the beacon signal with a plurality of receive beam patterns (e.g., the beamset b(DU2) in FIG. 1). The plurality of receive beam patterns can be a sequence (e.g., a raster sequence) of receive beams that substantially fill a selected range of elevation and/or azimuth, with the objective of finding a preferred receive beam matching the elevation and/or azimuth of the target, i.e., repeater R1. For each transmit beam pattern in the plurality of transmit beam patterns, repeater R2 can detect a plurality of received signal strengths corresponding to a respective plurality of receive beam patterns. For example, if the sequence of receive beam patterns is a raster sequence for a range of elevation and azimuth, repeater R2 can determine a “heat map” of received signal strength, with one “heat map” for each transmit beam pattern in the plurality of transmit beam patterns.

Fourth, the detected received signal strengths are provided to the control system by repeater R2. For example, repeater R2 can report a set of “heat maps” for each transmit beam pattern in the plurality of transmit beam patterns.

Fifth, based on the received signal strengths, the control system can select one or more preferred transmit beam patterns and one or more preferred receive beam patterns to align repeater R1 with repeater R2. To commission repeater R1 and repeater R2 for multi-hop operation with proper alignment, the control system can instruct repeater R1 to operate with the one or more preferred transmit beam patterns, and the control system can instruct repeater R2 to operate with the one or more preferred receive beam patterns. In the illustrative example of FIG. 1, the shaded beam p1 in beamset p (SU1_1) indicates a preferred transmit beam pattern and the shaded beam p2 in beamset b(DU2) indicates a preferred receive pattern, the shaded beams together providing alignment between repeater R1 and repeater R2 for multi-hop operation.

In some approaches, repeaters R1 and R2 are both open-air repeaters. In other approaches, repeater R1 can be an open-air repeater while repeater R2 can be an indoor subscriber repeater. In yet other approaches, it is contemplated that the repeater R2 can be replaced with a CPE that is aligned with R1 in a manner equivalent to the R1-R2 alignment procedure described above.

Example 2: Series Configuration of a Three-Repeater System

Figure 2:
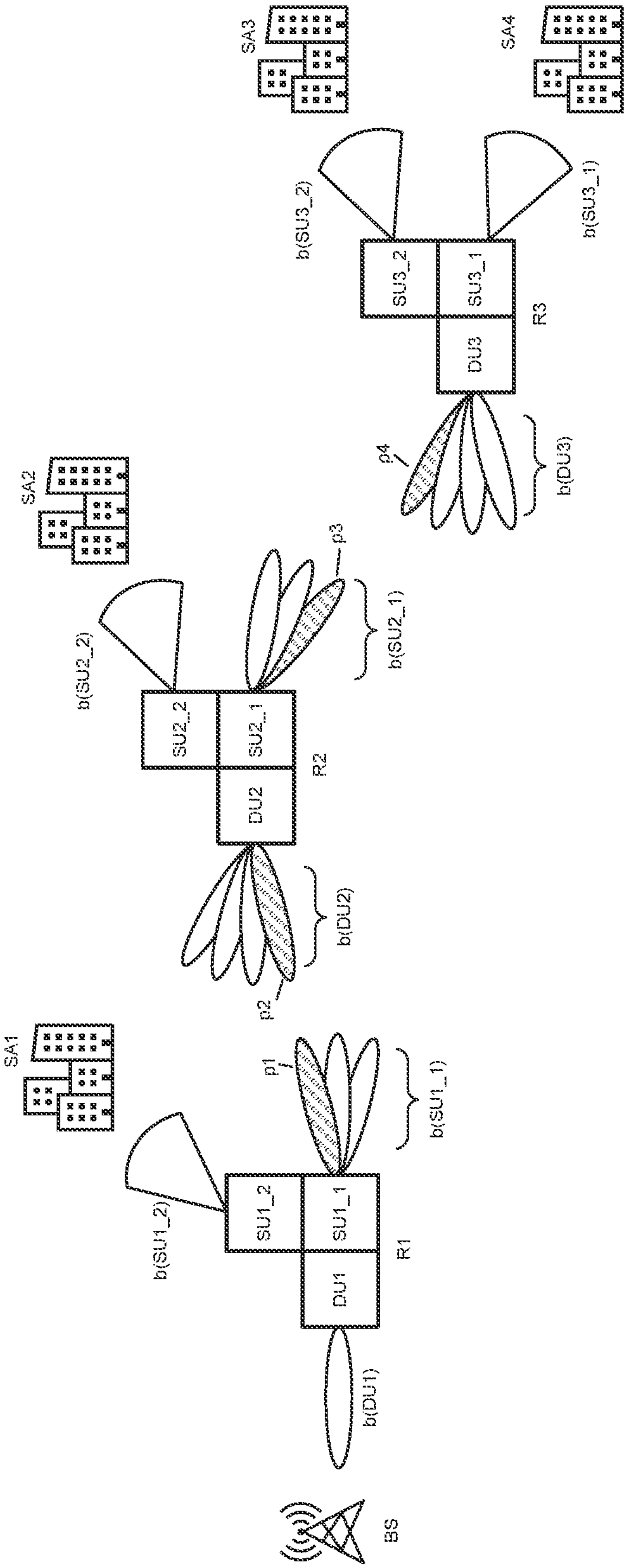
FIG. 2 depicts an illustrative multi-hop repeater system that includes three repeaters, with the second and third repeaters arranged in series.

With reference now to FIG. 2, an illustrative three-repeater system is depicted in a series configuration. In this example, it is desirable to use first, second, and third repeaters R1, R2, and R3 to expand the area that is served by the wireless base station BS, with the third repeater R3 connected in series with repeater R2.

In this example, repeater R2 can be aligned with repeater R1 using the alignment procedure described above in the context of FIG. 1: (1) repeater R1 is instructed to generate a beacon signal; (2) repeater R1 transmits the beacon signal over SU1_1 with a plurality of transmit beam patterns b(SU1_1); (3) repeater R2 receives the beacon signal over DU2 with a plurality of receive beam patterns b(DU2); (4) received signal strengths are transmitted to a repeater control system; and (5) repeaters R1 and R2 are instructed to operate with preferred transmit beam p1 and preferred receive beam p2 selected from the beamsets b(SU1_1) and b(DU2), respectively.

In this series configuration example, repeater R3 can be aligned with repeater R2 in a manner similar to the R1-R2 alignment procedure: (1) repeater R2 is instructed to generate a beacon signal; (2) repeater R2 transmits the beacon signal over SU2_1 with a plurality of transmit beam patterns b(SU2_1); (3) repeater R3 receives the beacon signal over DU3 with a plurality of receive beam patterns b(DU3); (4) received signal strengths are transmitted to a repeater control system; and (5) repeaters R2 and R3 are instructed to operate with preferred transmit beam p3 and preferred receive beam p4 selected from the beamsets b(SU2_1) and b(DU3), respectively.

Example 3: Parallel Configuration of a Three-Repeater System

Figure 3:
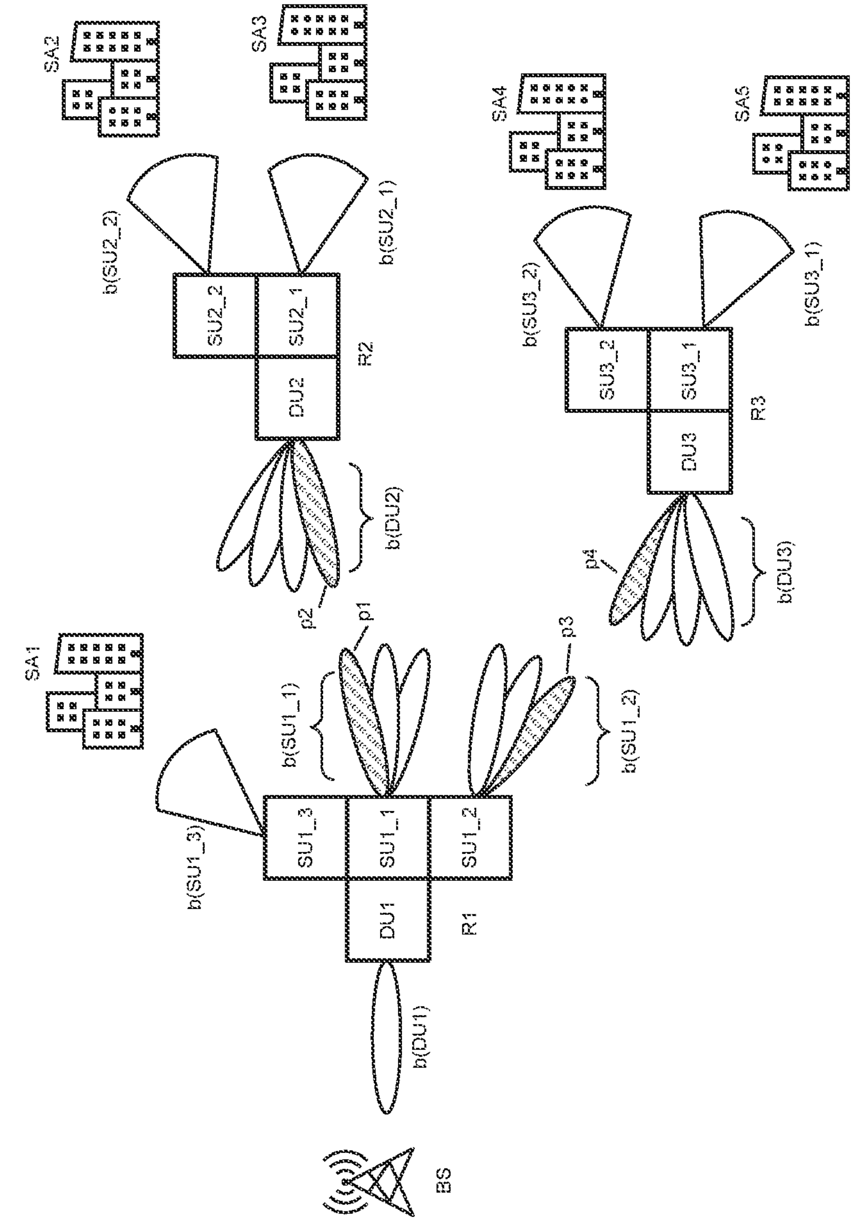
FIG. 3 depicts an illustrative multi-hop repeater system that includes three repeaters, with the second and third repeaters arranged in parallel.

With reference now to FIG. 3, an illustrative three-repeater system is depicted in a parallel configuration. In this example, it is desirable to use first, second, and third repeaters R1, R2, and R3 to expand the area that is served by the wireless base station BS, with both the second repeater R2 and the third repeater R3 connected in parallel to repeater R1.

In this example, repeater R2 can be aligned with repeater R1 using the alignment procedure described above in the context of FIG. 1: (1) repeater R1 is instructed to generate a beacon signal with service unit SU1_1; (2) repeater R1 transmits the beacon signal over SU1_1 with a plurality of transmit beam patterns b(SU1_1); (3) repeater R2 receives the beacon signal over DU2 with a plurality of receive beam patterns b(DU2); (4) received signal strengths are transmitted to a repeater control system; and (5) repeaters R1 and R2 are instructed to operate with preferred transmit beam p1 for service unit SU1_1 and preferred receive beam p2 for donor unit DU2 selected from the beamsets b(SU1_1) and b(DU2), respectively.

In this parallel configuration example, repeater R3 can also be aligned with repeater R1 using a similar, parallel alignment procedure: (1) repeater R1 is instructed to generate a beacon signal with service unit SU1_2; (2) repeater R1 transmits the beacon signal over SU1_2 with a plurality of transmit beam patterns b(SU1_2); (3) repeater R3 receives the beacon signal over DU3 with a plurality of receive beam patterns b(DU3); (4) received signal strengths are transmitted to a repeater control system; and (5) repeaters R1 and R3 are instructed to operate with preferred transmit beam p3 for service unit SU1_2 and preferred receive beam p4 for donor unit DU3 selected from the beamsets b(SU1_2) and b(DU3), respectively.

Process Flows

Figure 4:
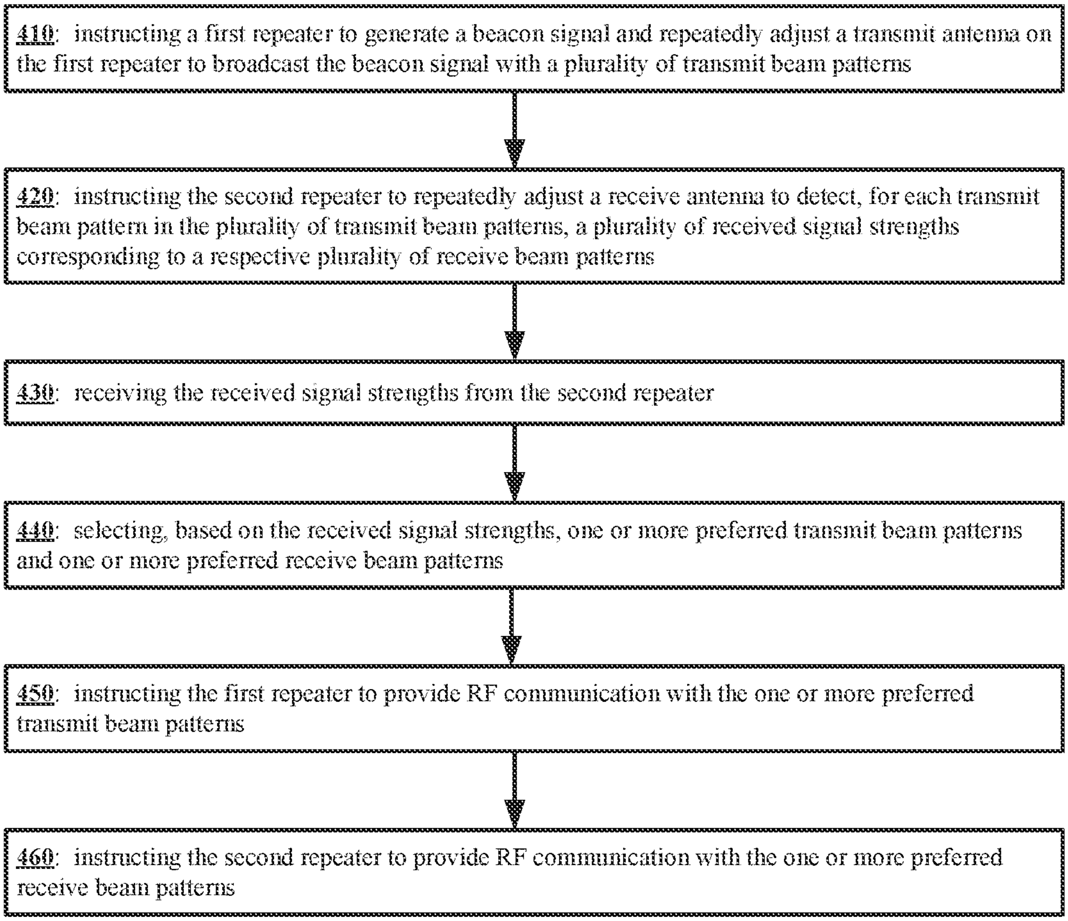
FIG. 4 depicts a process flow for alignment of multi-hop repeater systems.

With reference now to FIG. 4, an illustrative embodiment is depicted as a process flow diagram. The process 400 includes operation 410—instructing a first repeater to generate a beacon signal and repeatedly adjust a transmit antenna on the first repeater to broadcast the beacon signal with a plurality of transmit beam patterns. For example, in FIGS. 1-3, repeater R1 can be instructed by a repeater control system to generate a beacon signal (e.g., by inducing RF oscillation between DU1 and SU1_1), and the beacon signal can be broadcast by service unit SU1_1 with a plurality of transmit beam patterns b(SU1_1). As another example, in FIG. 2, repeater R2 can be instructed by a repeater control system to generate a beacon signal (e.g., by inducing RF oscillation between DU2 and SU2_1), and the beacon signal can be broadcast by service unit SU2_1 with a plurality of transmit beam patterns b(SU2_1). As another example, in FIG. 3, repeater R1 can be instructed by a repeater control system to generate a beacon signal (e.g., by inducing RF oscillation between DU1 and SU1_2), and the beacon signal can be broadcast by service unit SU1_2 with a plurality of transmit beam patterns b(SU1_2). While embodiments of the invention include a plurality of beams in the beamsets b(SU1_1), b(SU1_2), or b(SU2_1) as illustrated in these examples of FIGS. 1-3, it is contemplated that in other embodiments of the invention, the service units may only broadcast the beacon signal with a single transmit beam, e.g., in a scenario where a service unit SU1_1, SU1_2, or SU2_1 transmits the beacon signal with a static antenna such as a horn antenna.

The process further includes operation 420—instructing the second repeater to repeatedly adjust a receive antenna to detect, for each transmit beam pattern in the plurality of transmit beam patterns, a plurality of received signal strengths corresponding to a respective plurality of receive beam patterns. For example, in FIGS. 1-3, repeater R2 can be instructed by a repeater control system to repeatedly adjust a receive antenna on donor unit DU2 and detect a plurality of received signal strengths corresponding to a respective plurality of receive beam patterns b(DU2). As another example, in FIGS. 2-3, repeater R3 can by instructed by a repeater control system to repeatedly adjust a receive antenna on donor unit DU3 and detect a plurality of received signal strengths corresponding to a respective plurality of receive beam patterns b(DU3).

The process further includes operation 430—receiving the received signal strengths from the second repeater. For example, in FIGS. 1-3, repeater R2 can transmit the received signal strengths for the plurality of receive beam patterns b(DU2) to a repeater control system. As another example, in FIG. 2-3, repeater R3 can transmit the received signals strengths for the plurality of receive beam patterns b(DU3) to a repeater control system.

The process further includes operation 440—selecting, based on the received signal strengths, one or more preferred transmit beam patterns and one or more preferred receive beam patterns. For example, a repeater control system can select one or more preferred transmit beam patterns and one or more preferred receive patterns that correspond to the largest received signal strengths.

The process further includes operation 450—instructing the first repeater to provide RF communication with the one or more preferred transmit beam patterns. For example, in FIGS. 1-3, repeater R1 can be instructed by a repeater control system to operate service unit SU1_1 with preferred beam p1. As another example, in FIG. 3, repeater R1 can be instructed by a repeater control system to operate service unit SU1_2 with preferred beam p3. As another example, in FIG. 2, repeater R2 and be instructed by a repeater control system to operate service unit SU2_1 with preferred beam p3.

The process further includes operation 460—instructing the second repeater to provide RF communication with the one or more preferred receive beam patterns. For example, in FIGS. 1-3, repeater R2 can be instructed by a repeater control system to operate donor unit DU2 with preferred beam p2. As another example, in FIGS. 2-3, repeater R3 can be instructed by a repeater control system to operate donor unit DU3 with preferred beam p4.

Illustrative Computation Environment

Figure 5:
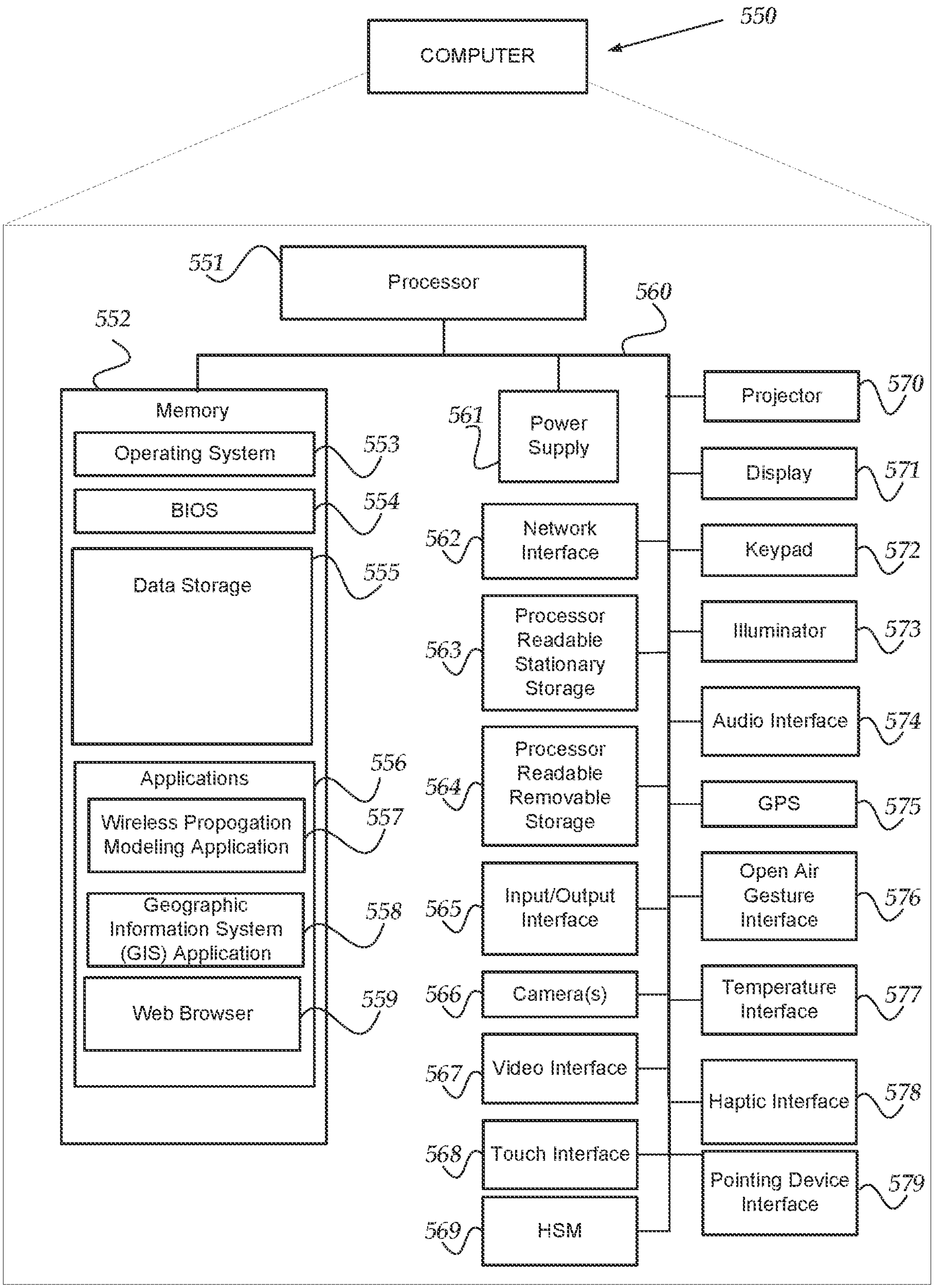
FIG. 5 depicts an exemplary computer system.

FIG. 5 shows one embodiment of computer 550 that may include many more, or less, components than those shown. In one or more embodiments, the operation and/or configuration of computer 550 may be included in a distributed cloud computing platform, a remote computer or remote computing system, a local computer or local computing system, a desktop computer, a notebook computer or a mobile device.

Computer 550 may include processor 551 in communication with memory 552 via bus 560. Computer 550 may also include power supply 561, network interface 562, audio interface 574, display 571, keypad 572, illuminator 573, video interface 567, input/output interface 565, haptic interface 578, global positioning systems (GPS) receiver 575, open air gesture interface 576, temperature interface 577, camera(s) 567, projector 570, pointing device interface 579, processor-readable stationary storage device 563, and processor-readable removable storage device 564. Computer 550 may optionally communicate with a wireless base station (not shown), a wireless repeater device (not shown) or directly with another computer. Power supply 561 may provide power to computer 550. A rechargeable or non-rechargeable battery may be used to provide power. The power may also be provided by an external power source, such as an AC adapter or a powered docking cradle that supplements or recharges the battery.

Network interface 562 includes circuitry for coupling computer 550 to one or more networks, and it is constructed for use with one or more wired and/or wireless communication protocols and technologies. Examples of various generations (e.g., third (3G), fourth (4G), or fifth (5G) of communication protocols and/or technologies may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), 5G New Radio (5G NR), 5G Technical Forum (5G TF), 5G Special Interest Group (5G SIG), Narrow Band Internet of Things (NB IoT), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies.

Audio interface 574 may be arranged to produce and receive audio signals such as the sound of a human voice. For example, audio interface 574 may be coupled to a speaker and microphone (not shown) to enable telecommunication with others or generate an audio acknowledgement for some action. A microphone in audio interface 574 can also be used for input to or control of computer 550, e.g., using voice recognition, detecting touch based on sound, and the like.

Display 571 may be a liquid crystal display (LCD), gas plasma, electronic ink, light emitting diode (LED), Organic LED (OLED) or any other type of light reflective or light transmissive display that can be used with a computer. Display 571 may also include a touch interface 668 arranged to receive input from an object such as a stylus or a digit from a human hand, and may use resistive, capacitive, surface acoustic wave (SAW), infrared, radar, or other technologies to sense touch or gestures.

Projector 570 may be a remote handheld projector or an integrated projector that is capable of projecting an image on a remote wall or any other reflective object such as a remote screen.

Video interface 567 may be arranged to capture video images, such as a still photo, a video segment, an infrared video, or the like. For example, video interface 567 may be coupled to a digital video camera, a web-camera, or the like. Video interface 567 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 572 may comprise any input device arranged to receive input from a user. For example, keypad 572 may include a push button numeric dial, or a keyboard. Keypad 572 may also include command buttons that are associated with selecting and sending images.

Illuminator 573 may provide a status indication or provide light. Illuminator 573 may remain active for specific periods of time or in response to event messages. For example, when illuminator 573 is active, it may backlight the buttons on keypad 572 and stay on while the computer is powered. Also, illuminator 573 may backlight these buttons in various patterns when particular actions are performed, such as dialing another computer. Illuminator 573 may also enable light sources positioned within a transparent or translucent case of the computer to illuminate in response to actions.

Further, computer 550 may also comprise hardware security module (HSM) 569 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 569 may be a stand-alone computer, in other cases, HSM 569 may be arranged as a hardware card that may be added to a computer.

Computer 550 may also comprise input/output interface 565 for communicating with external peripheral devices or other computers such as other computers and network computers. The peripheral devices may include an audio headset, virtual reality headsets, display screen glasses, remote speaker system, remote speaker and microphone system, and the like. Input/output interface 665 can utilize one or more technologies, such as Universal Serial Bus (USB), Infrared, WiFi, WiMax, Bluetooth™, and the like.

Input/output interface 565 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to computer 550.

Haptic interface 578 may be arranged to provide tactile feedback to a user of the computer. For example, the haptic interface 578 may be employed to vibrate computer 550 in a particular way when another user of a computer is calling. Temperature interface 577 may be used to provide a temperature measurement input or a temperature changing output to a user of computer 550. Open air gesture interface 576 may sense physical gestures of a user of computer 550, for example, by using single or stereo video cameras, radar, a gyroscopic sensor inside a computer held or worn by the user, or the like. One or more cameras 566 may be used by an application to employ facial recognition methods to identify a user, track the user's physical eye movements, or take pictures (images) or videos.

GPS device 575 can determine the physical coordinates of computer 550 on the surface of the Earth, which typically outputs a location as latitude and longitude values. GPS device 575 can also employ other geo-positioning mechanisms, including, but not limited to, triangulation, assisted GPS (AGPS), Enhanced Observed Time Difference (E-OTD), Cell Identifier (CI), Service Area Identifier (SA1) Tracking Area Identifier (TAI), Enhanced Timing Advance (ETA), Base Station Subsystem (BSS), or the like, to further determine the physical location of computer 750 on the surface of the Earth. It is understood that GPS device 575 can employ a gyroscope to determine an orientation and/or an accelerometer to determine movement of the computer 550. In one or more embodiment, however, computer 550 may, through other components, provide other information that may be employed to determine a physical location of the computer, including for example, a Media Access Control (MAC) address, IP address, and the like.

Human interface components can be peripheral devices that are physically separate from computer 550, allowing for remote input or output to computer 550. For example, information routed as described here through human interface components such as display 571 or keypad 572 can instead be routed through network interface 562 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a computer with such peripheral human interface components is a wearable computer, which might include a remote pico projector along with one or more cameras that remotely communicate with a separately located computer to sense a user's gestures toward portions of an image projected by the pico projector onto a reflected surface such as a wall or the user's hand.

Computer 550 may include wireless propagation modeling application 557 (WPM) that may be configured to remotely model propagation of wireless signals at one or more locations in one or more wireless networks. For example, WPM may model propagation of wireless signals according to a 3GPP or similar wireless signal propagation model, which may account for, e.g., attenuation due to distance, attenuation due to intervening foliage, etc. WPM 557 may employ geographical information provided by Geographic Information System (GIS) application 558 regarding the one or more locations. In one or more embodiments, WPM 558 may utilize an IoT network to communicate with the at least a portion of the elements in the one or more wireless networks, including the plurality of wireless signal repeater devices.

Computer 550 may include web browser application 559 that is configured to receive and to send web pages, web-based messages, graphics, text, multimedia, and the like. The computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 552 may include Random Access Memory (RAM), Read Only Memory (ROM), or other types of memory. Memory 552 illustrates an example of computer-readable storage medium (devices) for storage of information such as computer-readable instructions, data structures, program modules or other data. Memory 552 may store BIOS 554 for controlling low-level operation of computer 550. The memory may also store operating system 553 for controlling the operation of computer 550. It will be appreciated that this component may include a general-purpose operating system such as a version of UNIX, or LINUX™, or a specialized computer communication operating system such as Windows Phone™, Apple IOS™ or the Symbian® operating system. The operating system may include, or interface with a Java virtual machine module that enables control of hardware components or operating system operations via Java application programs.

Memory 552 may further include one or more data storage 555, which can be utilized by computer 550 to store, among other things, applications 556 or other data. For example, data storage 555 may also be employed to store information that describes various capabilities of computer 550. The information may then be provided to another device or computer based on any of a variety of methods, including being sent as part of a header during a communication, sent upon request, or the like. Data storage 555 may also be employed to store social networking information including address books, buddy lists, aliases, user profile information, or the like. Data storage 555 may further include program code, data, algorithms, and the like, for use by a processor, such as processor 551 to execute and perform actions. In one embodiment, at least some of data storage 555 might also be stored on another component of computer 550, including, but not limited to, non-transitory processor-readable removable storage device 564, processor-readable stationary storage device 563, or even external to the computer.

Applications 556 may include computer executable instructions which, when executed by computer 550, transmit, receive, or otherwise process instructions and data. Applications 556 may include, for example, WPM application 557, GIS application 558, web browser 559, or the like. Computers may be arranged to exchange communications, such as, queries, searches, messages, notification messages, event messages, alerts, performance metrics, log data, API calls, or the like, combination thereof, with application servers or network monitoring computers.

Other examples of application programs include calendars, search programs, email applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), computer 550 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), computer 550 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Also, in one or more embodiments, a system may comprise one or more processors and one or more memories that store instructions. Further, the one or more processors that execute the instructions may be configured to carry out any of the methods disclosed herein including, but not limited to, the claimed embodiments.

Additionally, in one or more embodiments, a computer-readable non-transitory medium may be arranged to store instructions. Further, one or more processors that execute the instructions may be configured to carry out any of the methods disclosed herein including, but not limited to, the claimed embodiments.

What is claimed as new and desired to be protected by Letters Patent of the United States is:

1. A method of operating a first repeater to align with a second repeater of a plurality of repeaters for RF communication between a base station and user equipment by way of at least the first and second repeaters, comprising:

generating a beacon signal with the first repeater that is configured for alignment, wherein the beacon signal includes a plurality of radio frequency (RF) oscillation signals that simulate feedback that is suppressed during RF communication;

repeatedly adjusting a transmit antenna on the first repeater to broadcast the beacon signal with a plurality of transmit beam patterns; and selecting one or more of the plurality of transmit beam patterns for the first repeater and one or more of a plurality of receive beam patterns for the second repeater for alignment with the first repeater that is reconfigured for RF communication with the second repeater based on a transmit signal strength of each of the plurality of transmit beam patterns and a receive signal strength for each of a plurality of receive beam patterns corresponding to the second repeater.

2. The method of claim 1, wherein the generating of the beacon signal further comprises:

increasing RF gain in the first repeater to produce RF oscillations.

3. The method of claim 1, wherein the transmit antenna is an electrically adjustable antenna.

4. The method of claim 3, wherein the electrically adjustable antenna is a holographic beamforming antenna or a phased array antenna.

5. The method of claim 1, wherein the repeated adjustment further includes:

selecting a range of one or more of elevation or azimuth for the plurality of transmit beam patterns.

6. The method of claim 5, wherein the repeated adjustment, further comprises:

repeatedly adjusting to substantially fill the selected range of the one or more of elevation or azimuth with a dither sequence of transmit beam patterns.

7. The method of claim 5, wherein the range of the one or more of elevation or azimuth corresponds to a beamwidth of the antenna.

8. The method of claim 5, wherein the range of the one or more of elevation or azimuth corresponds to a range of uncertainty for mechanical orientation of the first repeater for alignment with the second repeater.

9. The method of claim 5, wherein the range of the one or more of elevation or azimuth corresponds to a range of discrepancy between a reported mechanical orientation from installation of the first repeater and an expected bearing from the first repeater to the second repeater based on global navigation satellite system (GNSS) coordinates of the first and second repeaters.

10. A method of operating a second repeater to align with a first repeater for Radio Frequency (RF) communication between a base station and user equipment by way of at least the first and second repeaters, comprising:

for each transmit beam pattern from a plurality of transmit beam patterns for broadcast of a beacon signal from the first repeater, repeatedly adjusting a receive antenna on the second repeater to detect a plurality of received signal strengths corresponding to a respective plurality of receive beam patterns, wherein the beacon signal includes a plurality of RF oscillation signals that simulate feedback that is suppressed during RF communication; and selecting one or more of the plurality of receive beam patterns of the second repeater for alignment with the first repeater based on a transmit signal strength of each of the plurality of transmit beam patterns and a receive signal strength for each of the plurality of receive beam patterns.

11. The method of claim 10, wherein the receive antenna is an electrically adjustable antenna.

12. The method of claim 11, wherein the electrically adjustable antenna is a holographic beamforming antenna or a phased array antenna.

13. The method of claim 10, wherein the repeated adjustment further includes:

selecting a range of one or more of elevation or azimuth for the plurality of receive beam patterns.

14. The method of claim 13, wherein the repeated adjustment further comprises:

repeatedly adjusting to substantially fill the selected range of elevation and/or azimuth with a raster sequence of receive beam patterns.

15. A method of aligning a first repeater and a second repeater of a plurality of repeaters for Radio Frequency (RF) communication between a base station and user equipment by way of at least the first and second repeaters, comprising:

instructing the first repeater to generate a beacon signal and repeatedly adjust a transmit antenna on the first repeater to broadcast the beacon signal with a plurality of transmit beam patterns, wherein the beacon signal includes a plurality of radio frequency (RF) oscillation signals to simulate feedback that is suppressed during RF communication;

instructing the second repeater to repeatedly adjust a receive antenna to detect, for each transmit beam pattern in the plurality of transmit beam patterns, a plurality of received signal strengths corresponding to a respective plurality of receive beam patterns;

receiving the received signal strengths from the second repeater;

selecting, based on a plurality of transmit signal strengths from the first repeater, the corresponding received signal strengths from the second repeater, one or more preferred transmit beam patterns and one or more preferred receive beam patterns;

instructing the first repeater to provide RF communication with the one or more preferred transmit beam patterns; and instructing the second repeater to provide RF communication with the one or more preferred receive beam patterns.

16. The method of claim 15, wherein one or more portions of the RF communication between the base station, user equipment, and the plurality of repeaters is communicated via an internet-of-things (IOT) messaging protocol.

17. The method of claim 15, wherein the instructing to generate the beacon signal is an instructing to increasing RF gain in the first repeater to produce RF oscillations.

18. The method of claim 15, wherein the transmit antenna is an electrically adjustable antenna.

19. The method of claim 18, wherein the electrically adjustable antenna is a holographic beamforming antenna or a phased array antenna.

20. The method of claim 15, wherein the instructing to repeatedly adjust the transmit antenna includes:

selecting a range of one or more of elevation or azimuth for the plurality of transmit beam patterns.

21. The method of claim 20, wherein the repeated adjustment, further comprises:

repeatedly adjusting to substantially fill the selected range of the one or more of elevation or azimuth with a dither sequence of transmit beam patterns.

22. The method of claim 20, wherein the range of the one or more of elevation or azimuth corresponds to one or more of an elevation or an azimuth beamwidth of the antenna.

23. The method of claim 20, wherein the range of the one or more of elevation or azimuth corresponds to a range of uncertainty for mechanical orientation of the first repeater for alignment with the second repeater.

24. The method of claim 20, wherein the range of the one or more of elevation or azimuth corresponds to a range of discrepancy between a reported mechanical orientation from installation of the first repeater and an expected bearing from the first repeater to the second repeater based on global navigation satellite system (GNSS) coordinates of the first and second repeaters.

25. The method of claim 15, wherein the receive antenna is an electrically adjustable antenna.

26. The method of claim 25, wherein the electrically adjustable antenna is a holographic beamforming antenna or a phased array antenna.

27. The method of claim 15, wherein the instructing to repeatedly adjust the receive antenna includes:

selecting a range of one or more of elevation or azimuth for the plurality of receive beam patterns.

28. The method of claim 27, wherein the repeatedly adjusting with the plurality of receive beam patterns is a repeatedly adjusting to substantially fill the selected range of the one or more of elevation or azimuth with a raster sequence of receive beam patterns.

* * * * *